(12) United States Patent
Kelleher

(10) Patent No.: US 10,352,013 B2
(45) Date of Patent: Jul. 16, 2019

(54) GROUND MOUNTING ASSEMBLY

(71) Applicant: Stephen Kelleher, Fairhaven, MA (US)

(72) Inventor: Stephen Kelleher, Fairhaven, MA (US)

( * ) Notice: Subject to any disclaimer, the term of this patent is extended or adjusted under 35 U.S.C. 154(b) by 0 days.

(21) Appl. No.: 15/820,173

(22) Filed: Nov. 21, 2017

(65) Prior Publication Data

US 2018/0155892 A1 Jun. 7, 2018

Related U.S. Application Data

(63) Continuation-in-part of application No. 14/777,441, filed on Sep. 15, 2015, now abandoned, which is a
(Continued)

(51) Int. Cl.
*E02B 3/20* (2006.01)
*E02B 3/24* (2006.01)
(Continued)

(52) U.S. Cl.
CPC ............... *E02D 5/74* (2013.01); *E02D 5/285* (2013.01); *E02D 5/54* (2013.01); *E02D 7/02* (2013.01);
(Continued)

(58) Field of Classification Search
CPC ........... E02D 5/74; E02D 5/54; E02D 27/525; E02D 7/02; E02D 27/50; E02D 5/285;
(Continued)

(56) References Cited

U.S. PATENT DOCUMENTS

| 417,383 A | * | 12/1889 | Christ | ............... | E04F 11/181 |
| | | | | | 256/59 |
| 505,357 A | | 9/1893 | Hansbarger | .................. | 256/58 |

(Continued)

FOREIGN PATENT DOCUMENTS

| EP | 1990586 | 11/2008 | ............... F24J 2/54 |
| GB | 11138 | 1/1911 | |

(Continued)

OTHER PUBLICATIONS

Chinese Fifth Office Action (w/translation) issued in application No. 201280066667.0, dated Oct. 20, 2017 (22 pgs).
(Continued)

*Primary Examiner* — Phi D A
*Assistant Examiner* — Omar F Hijaz
(74) *Attorney, Agent, or Firm* — Hayes Soloway P.C.

(57) ABSTRACT

A ground mounting assembly includes one or a plurality of posts, each attached to at least one stabilizing plate or scoop pyramid. The post may be driven into the ground and then lifted to deploy plates into a locking mechanism, or driven into the ground by a pile driver with plate held in place, released, and driven further and deployed into a locking mechanism, or driven into the ground and double pounded inside the post to drive reinforcing plate into slotted winglets, or driven, double pounded and rotated to extend the reinforcing plates horizontally from the pole or pile. The post also can used as a mooring in harbors, lakes, or at sea. A system based on a double pounder pile driven mono pole, optionally extendable in length, is also described.

9 Claims, 45 Drawing Sheets

Related U.S. Application Data continuation-in-part of application No. 13/839,842, filed on Mar. 15, 2013, now Pat. No. 9,611,609, which is a continuation-in-part of application No. 13/676,990, filed on Nov. 14, 2012, now Pat. No. 9,574,795.

(60) Provisional application No. 61/560,037, filed on Nov. 15, 2011.

(51) Int. Cl.

| | |
|---|---|
| E02D 5/28 | (2006.01) |
| E02D 5/54 | (2006.01) |
| E02D 5/74 | (2006.01) |
| E02D 5/80 | (2006.01) |
| E02D 7/02 | (2006.01) |
| E02D 27/50 | (2006.01) |
| E02D 27/52 | (2006.01) |
| F24S 25/12 | (2018.01) |
| F24S 25/13 | (2018.01) |
| H02S 20/10 | (2014.01) |
| H02S 20/32 | (2014.01) |
| F24S 25/617 | (2018.01) |

(52) U.S. Cl.
CPC ........... *E02D 27/50* (2013.01); *E02D 27/525* (2013.01); *F24S 25/12* (2018.05); *F24S 25/617* (2018.05); *H02S 20/10* (2014.12); *H02S 20/32* (2014.12); *E02B 3/20* (2013.01); *E02B 3/24* (2013.01); *E02D 5/80* (2013.01)

(58) Field of Classification Search
CPC . E02D 5/80; H02S 20/10; H02S 20/32; E02B 3/20; E02B 3/24
See application file for complete search history.

(56) References Cited

U.S. PATENT DOCUMENTS

| | | | | |
|---|---|---|---|---|
| 556,518 | A | 3/1896 | Phelps | 256/35 |
| 573,777 | A | 12/1896 | Johnson | 52/166 |
| 606,558 | A | 6/1898 | Ketchum | 52/154 |
| 826,908 | A * | 7/1906 | Thomas | E02D 5/803 |
| | | | | 114/305 |
| 844,231 | A * | 2/1907 | Bailey | E02D 5/803 |
| | | | | 52/160 |
| 852,555 | A | 5/1907 | Glassco | 52/116 |
| 904,198 | A | 11/1908 | Haase | |
| 1,142,046 | A | 6/1915 | Michod | 52/154 |
| 1,437,057 | A | 11/1922 | Holland | 256/58 |
| 1,924,834 | A | 8/1933 | Carrel | 52/154 |
| 1,940,430 | A * | 12/1933 | Morterra | E04H 12/223 |
| | | | | 244/115 |
| 2,176,566 | A * | 10/1939 | Dillon | E02D 5/803 |
| | | | | 52/160 |
| 2,366,997 | A * | 1/1945 | Brand | E02D 5/803 |
| | | | | 174/6 |
| 2,863,535 | A | 12/1958 | Clapper | 52/161 |
| 2,947,149 | A | 8/1960 | Barkley | 405/244 |
| 3,342,444 | A | 9/1967 | Nelson | 52/165 |
| 3,362,171 | A * | 1/1968 | Arpaia | E02D 5/44 |
| | | | | 405/244 |
| 3,512,319 | A * | 5/1970 | Piacentino | E02D 5/803 |
| | | | | 52/160 |
| 3,552,258 | A * | 1/1971 | Warner | F16B 13/0891 |
| | | | | 411/21 |
| 3,727,357 | A | 4/1973 | Stillman | 52/154 |
| 3,772,838 | A * | 11/1973 | Virnig | E02D 5/805 |
| | | | | 52/160 |
| 3,797,260 | A | 3/1974 | Webb | 405/172 |
| 3,888,057 | A | 6/1975 | Zubke | 52/163 |
| 3,969,853 | A | 7/1976 | Deike | 52/156 |
| 3,974,604 | A * | 8/1976 | Conn | E02D 5/805 |
| | | | | 405/244 |
| 3,983,779 | A | 10/1976 | Dimas | 85/21 |
| 4,086,735 | A * | 5/1978 | Adams | E02D 5/805 |
| | | | | 405/259.1 |
| 4,102,143 | A | 7/1978 | Phares et al. | 405/227 |
| 4,592,178 | A | 6/1986 | Lu | 52/155 |
| 4,889,451 | A * | 12/1989 | Simanjuntak | E02D 5/44 |
| | | | | 405/244 |
| 4,893,787 | A | 1/1990 | Watson | 256/35 |
| 4,936,703 | A | 6/1990 | Ferns | 404/25 |
| 5,028,166 | A | 7/1991 | Leishman | 404/10 |
| 5,217,194 | A * | 6/1993 | Brownell | A63G 9/00 |
| | | | | 135/118 |
| 5,226,829 | A | 7/1993 | Jones | 135/118 |
| 5,261,760 | A | 11/1993 | Castonguay | 404/7 |
| 5,349,775 | A * | 9/1994 | Mondares | A01K 97/10 |
| | | | | 248/125.1 |
| RE35,133 | E | 12/1995 | Halloran | 405/244 |
| 5,765,321 | A * | 6/1998 | Barbera | E02D 5/805 |
| | | | | 405/244 |
| 5,881,495 | A | 3/1999 | Clark | 47/48.5 |
| 5,941,018 | A | 8/1999 | Herrema | 47/33 |
| 5,975,808 | A * | 11/1999 | Fujita | E02D 5/28 |
| | | | | 405/244 |
| 5,984,587 | A | 11/1999 | Odle | 405/244 |
| 6,141,903 | A | 11/2000 | Mancini | 47/42 |
| 6,226,930 | B1 | 5/2001 | Kraatz | 52/64 |
| 6,302,099 | B1 | 10/2001 | McDermott | 126/600 |
| 6,328,273 | B1 | 12/2001 | Kemikem | 248/530 |
| 6,722,357 | B2 | 4/2004 | Shingleton | 126/600 |
| 7,070,362 | B2 * | 7/2006 | Rasmussen | E02D 5/44 |
| | | | | 405/232 |
| 7,175,141 | B2 | 2/2007 | Bolinder et al. | 248/156 |
| 7,225,760 | B2 | 6/2007 | Krieger | 119/786 |
| 7,686,283 | B2 | 3/2010 | Marchio | 256/73 |
| 8,544,221 | B2 | 10/2013 | Marley | 52/173.3 |
| 8,584,413 | B1 | 11/2013 | Keller, Sr. | 52/297 |
| 8,757,928 | B1 | 6/2014 | Smith | 405/128.7 |
| 2004/0115009 | A1 | 6/2004 | Bradley et al. | 405/259.1 |
| 2005/0167644 | A1 | 8/2005 | Deupree | 256/32 |
| 2007/0017166 | A1 * | 1/2007 | Nicolet | E02D 5/74 |
| | | | | 52/155 |
| 2007/0077133 | A1 | 4/2007 | Wesolowska | 411/508 |
| 2007/0170412 | A1 | 7/2007 | Lee | 256/59 |
| 2008/0271388 | A1 * | 11/2008 | Bayly | E02D 5/805 |
| | | | | 52/160 |
| 2008/0276549 | A1 | 11/2008 | Turley | 52/166 |
| 2009/0293379 | A1 | 12/2009 | Smith | 52/154 |
| 2010/0071755 | A1 | 3/2010 | Kruse | 136/251 |
| 2010/0127142 | A1 | 5/2010 | Genschorek | 248/222.14 |
| 2010/0139649 | A1 | 6/2010 | Almy et al. | 126/704 |
| 2011/0121144 | A1 | 5/2011 | Berbegal Pastor | 248/185.1 |
| 2011/0163051 | A1 | 7/2011 | Horanek | 211/26 |
| 2012/0047825 | A1 | 3/2012 | Chang et al. | 52/173.3 |
| 2012/0152316 | A1 | 6/2012 | Fischer et al. | 136/246 |

FOREIGN PATENT DOCUMENTS

| | | | | |
|---|---|---|---|---|
| WO | WO0106077 | | 1/2001 | E04H 12/22 |
| WO | WO2011014655 | | 2/2011 | F16M 11/10 |

OTHER PUBLICATIONS

Chinese Fourth Office Action (w/translation) issued in application No. 201280066667.0, dated Apr. 6, 2017 (16 pgs).
Chinese Office Action (no. translation) issued in application No. 201280066667.0, dated Oct. 9, 2015 (12 pgs).
Chinese Second Office Action issued in application No. 201280066667.0, dated Apr. 15, 2016 (10 pgs).
Chinese Third Office Action issued in application No. 201280066667.0, dated Oct. 25, 2016 (9 pgs).
International Preliminary Report on Patentability issued in application No. PCT/US2012/065072, dated May 14, 2015 (9 pgs).
International Preliminary Report on Patentability issued in application No. PCT/US2014/028686, dated Oct. 1, 2015 (11 pgs).

(56) References Cited

OTHER PUBLICATIONS

International Search Report and the Written Opinion issued for corresponding application No. PCT/US2012/065072, dated Jan. 25, 2013 (10 pgs).
International Search Report and Written Opinion issued in related application No. PCT/US2014/028686, dated Nov. 13, 2014 (14 pgs).
Notice of Allowance issued in U.S. Appl. No. 13,676,990, dated Oct. 7, 2016 (11 pgs).
Notice of Allowance issued in U.S. Appl. No. 13/839,842, dated Nov. 30, 2016 (14 pgs).
Office Action issued in U.S. Appl. No. 13/676,990, dated Apr. 5, 2016 (25 pgs).
Office Action issued in U.S. Appl. No. 13/676,990, dated Jul. 28, 2016 (22 pgs).
Office Action issued in U.S. Appl. No. 13/676,990, dated Nov. 4, 2015 (28 pgs).
Office Action issued in U.S. Appl. No. 13/839,842, dated Apr. 15, 2014 (15 pgs).
Office Action issued in U.S. Appl. No. 13/839,842, dated Jul. 1, 2015 (24 pgs).
Office Action issued in U.S. Appl. No. 13/839,842, dated Mar. 11, 2016 (25 pgs).
Office Action issued in U.S. Appl. No. 13/839,842, dated May 31, 2016 (18 pgs).
Office Action issued in U.S. Appl. No. 13/839,842, dated Oct. 21, 2015 (28 pgs).
Office Action issued in U.S. Appl. No. 14/777,441, dated Feb. 28, 2017 (17 pgs).
Office Action issued in U.S. Appl. No. 14/777,441, dated Aug. 25, 2017 (11 pgs).
Office Action issued in related U.S. Appl. No. 13/676,990, dated Jan. 30, 2015 (28 pgs).
Office Action issued in related U.S. Appl. No. 13/676,990, dated Jun. 30, 2015 (15 pgs).
Office Action issued in related U.S. Appl. No. 13/676,990, dated Dec. 16, 2013 (24 pgs).
Office Action issued in related U.S. Appl. No. 13/839,842, dated Jan. 29, 2015 (32 pgs).
Office Action issued in related U.S. Appl. No. 13/839,842, dated Aug. 25, 2014 (22 pgs).
Office Action issued in related U.S. Appl. No. 13/839,842, dated Jan. 15, 2014 (25 pgs).
Official Action issued in related U.S. Appl. No. 13,676,990 dated May 1, 2014 (21 pgs).
Official Action issued in related U.S. Appl. No. 13,676,990 dated Aug. 22 2014 (13 pgs).

\* cited by examiner

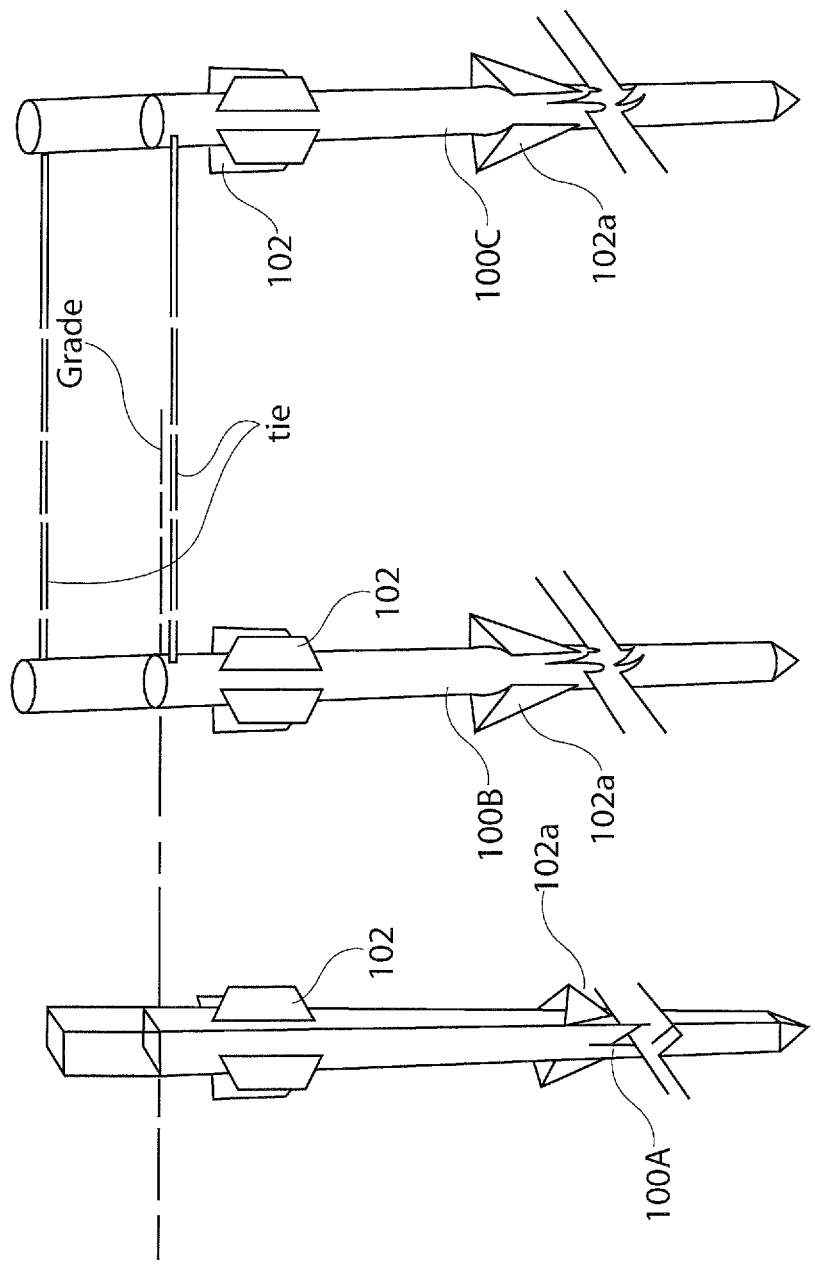

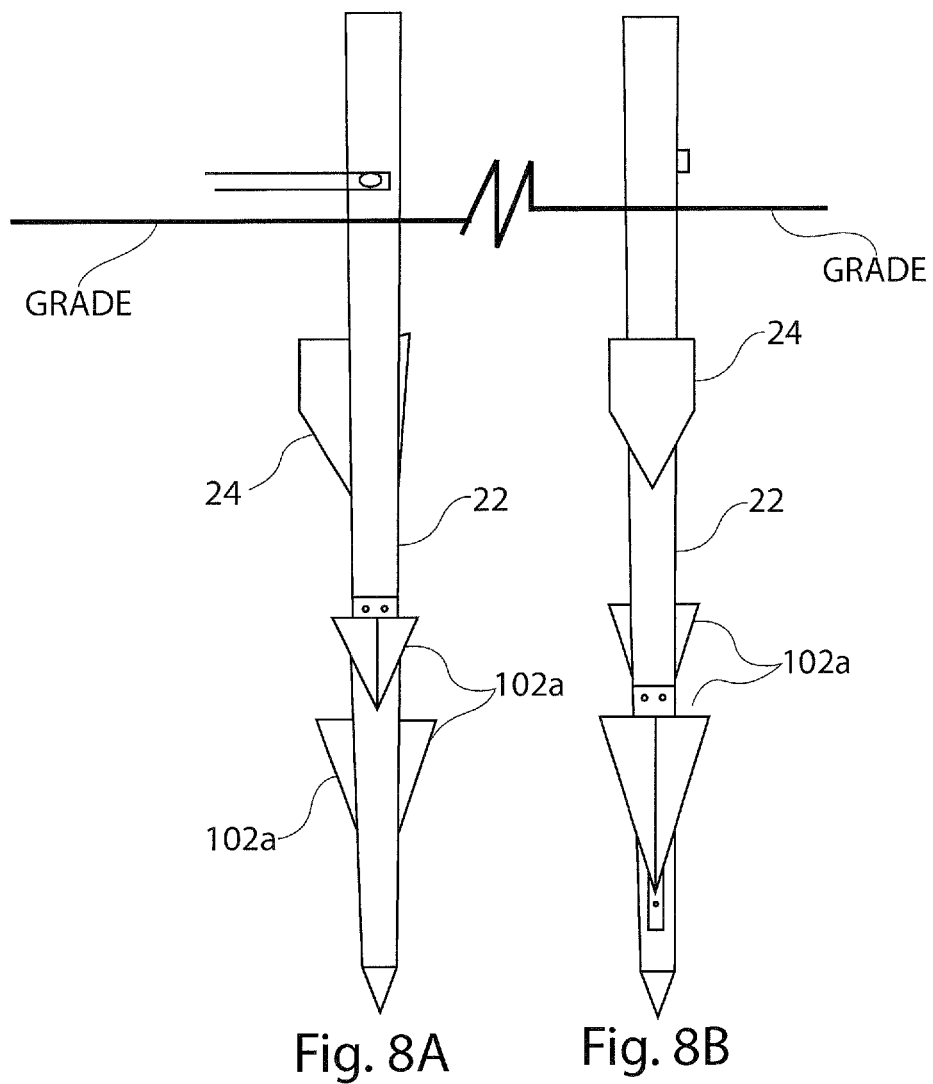
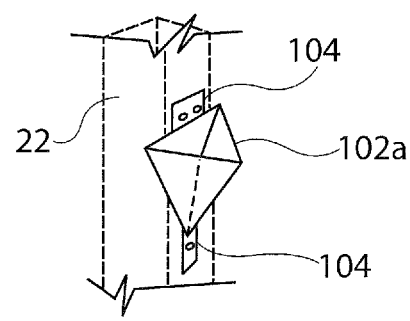
Fig. 8A    Fig. 8B
Fig. 8C

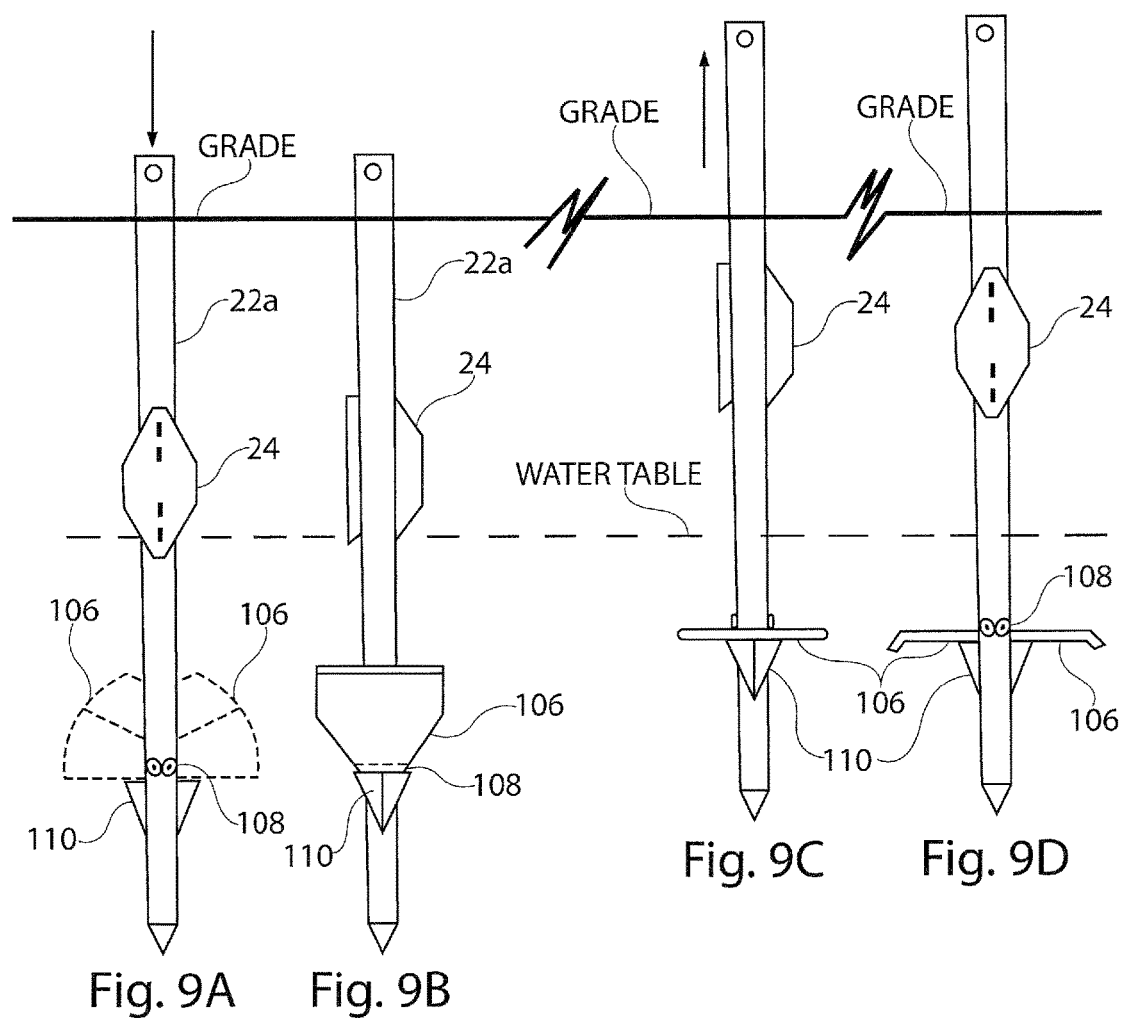

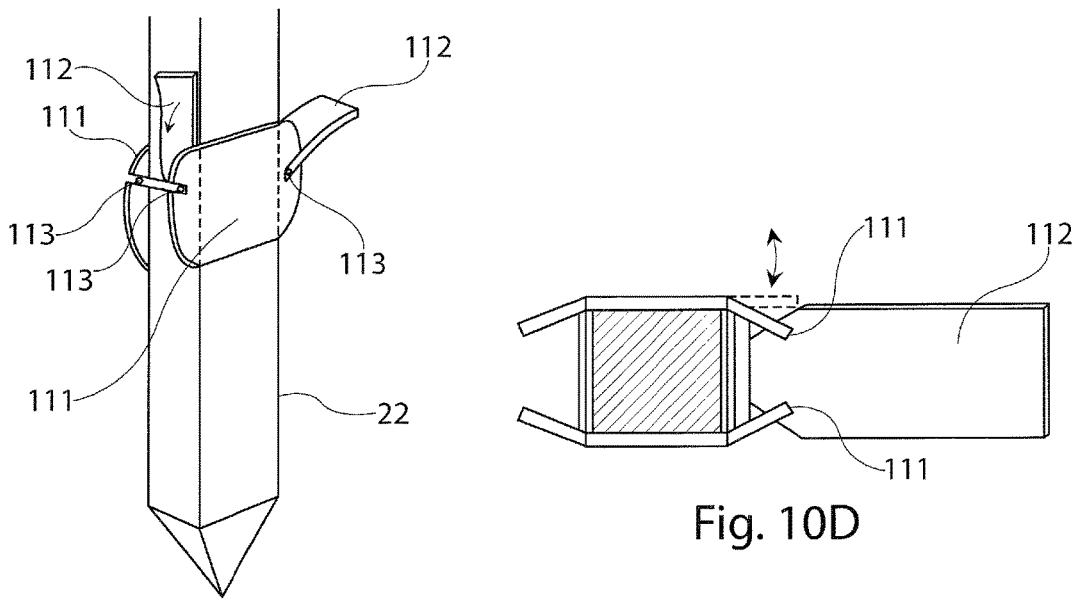
Fig. 10C
Fig. 10D
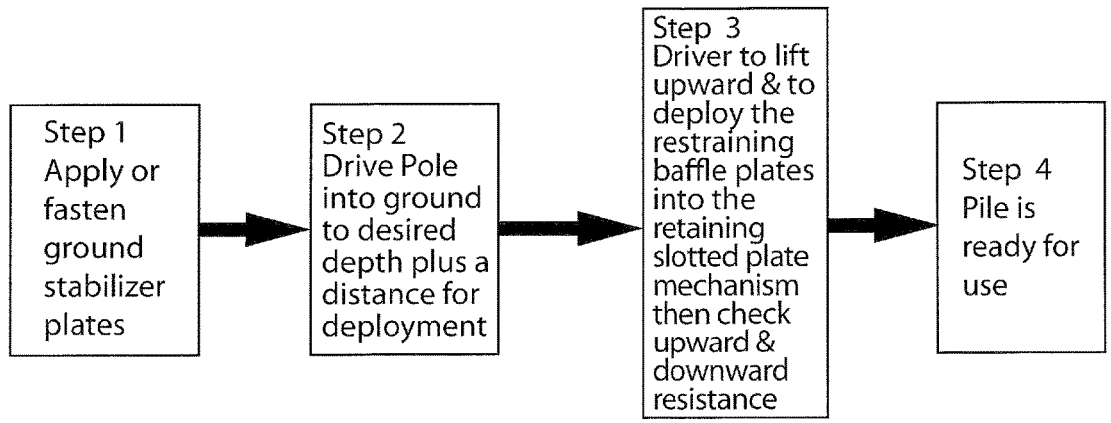
Fig. 10E

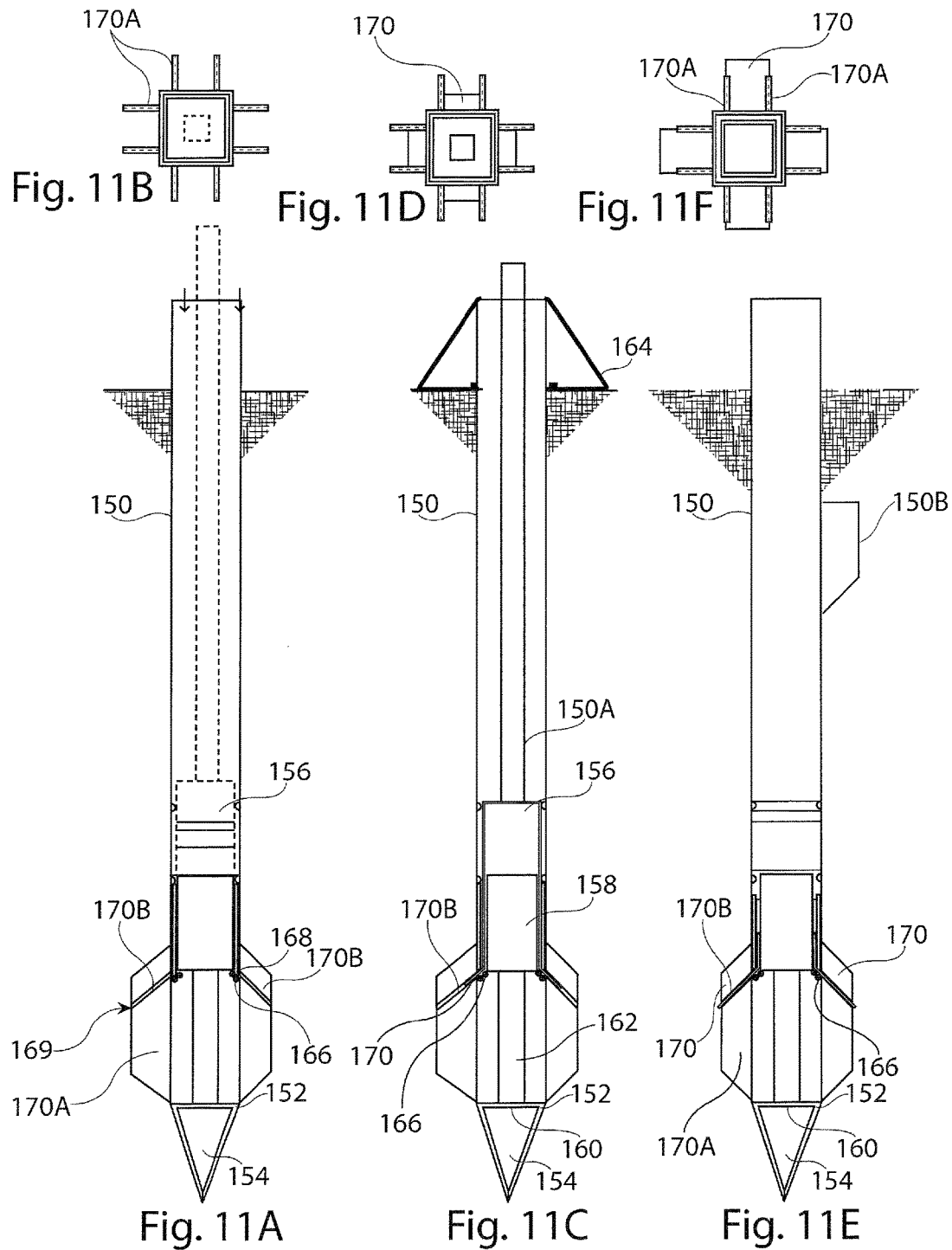

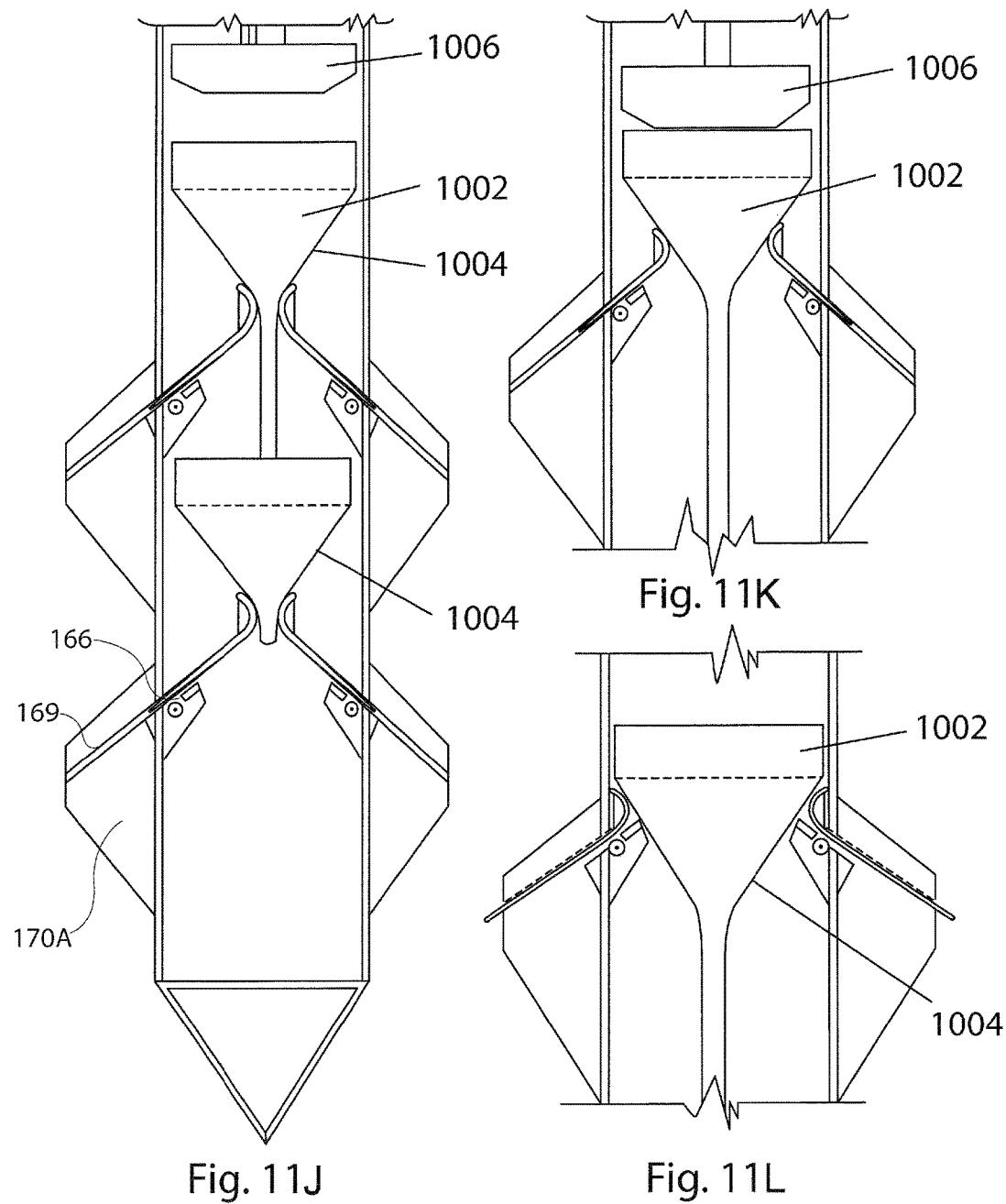

Parts of interior releasing mud flap / toggle moving device

TOP SECTION VIEW WORKING POSITION

TOP SECTION VIEW RELEASE / RETRIEVAL POSITION

CROSS SECTION VIEW IN RELEASE / RETRIEVAL POSITION

Fig. 17B Section A

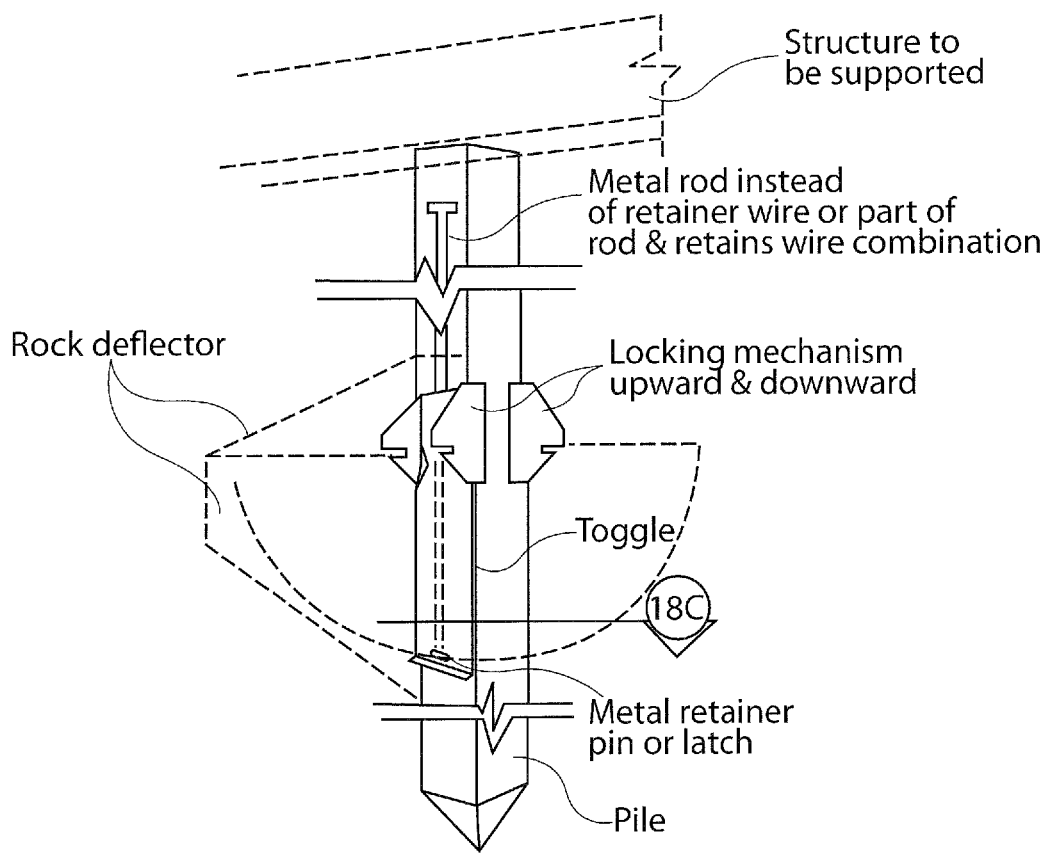
Fig. 17D
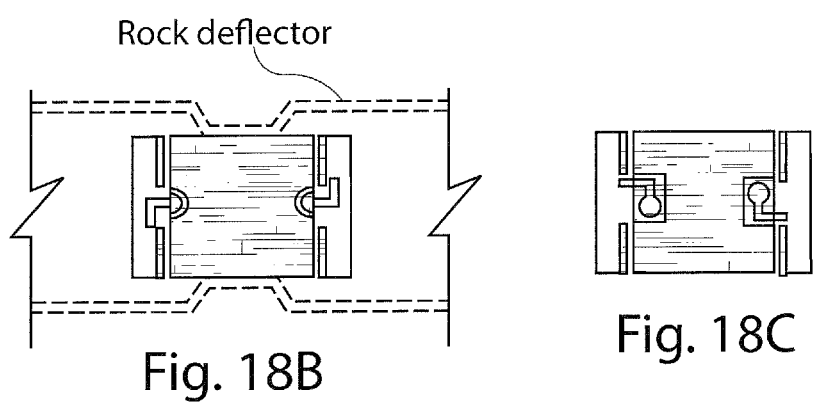
Fig. 18B
Fig. 18C

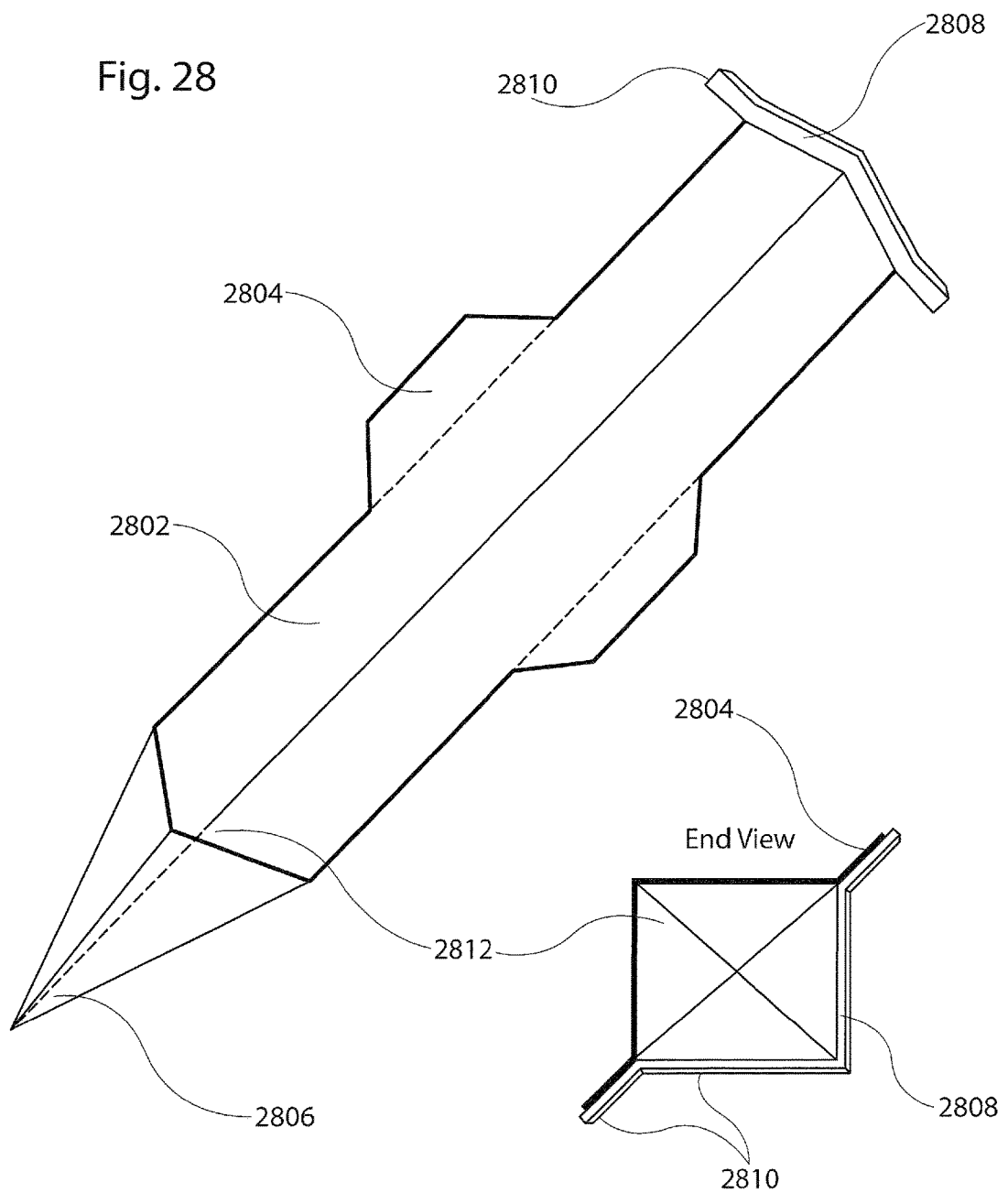

GROUND MOUNTING ASSEMBLY

CROSS REFERENCE TO RELATED APPLICATIONS

This application is a continuation-in-part of U.S. application Ser. No. 14/777,441 filed Sep. 15, 2015, which in turn is a continuation-in-part of U.S. application Ser. No. 13/839,842, filed Mar. 15, 2013, now U.S. Pat. No. 9,611,609, which application in turn is a continuation-in-part of U.S. application Ser. No. 13/676,990, filed Nov. 14, 2012, now U.S. Pat. No. 9,574,795, which application in turn claims priority from U.S. Provisional Application Ser. No. 61/560,037, filed Nov. 15, 2011.

BACKGROUND OF THE DISCLOSURE

The present disclosure is generally related to ground mounting assemblies, systems and methods for ground mounting structures. The invention has particular utility in connection with ground mounting photovoltaic solar panel assemblies, and will be described in connection with such utility, although other utilities are contemplated, such as docks, wharfs, moorings, architectural structures, accents and building, tents, and landscape reinforcements.

Many outdoor structures, such as solar panel assemblies, billboards, signs, docks, tents, wharfs, buildings and the like, are mounted into the ground using posts or poles. Often, these assemblies are subjected to high winds, which can loosen the mounting posts, thereby making the assembly unstable. For example, solar panel assemblies typically have a large surface area for capturing solar energy; however, such assemblies also may be subjected to wind forces, which may be translated into the mounting posts, thereby loosening the soil surrounding the mounting structure. This problem is particularly amplified where such assemblies are mounted in loose or sandy soil. The same is true in docks, wharfs, and buildings.

In the case of solar panel assemblies, many such assemblies are mounted with posts that do not have sufficient underground surface area to provide adequate resistance to counter the wind forces acting upon the above-ground solar panel assembly. For example, a commonly used post in such assemblies may be about 2.5 inches in width. To address the problem of instability, one known technique involves pouring a cement cap over the entire surface of the mounting structure. However, this is a very costly measure, and further suffers from the disadvantage of making the installation a permanent or semi-permanent fixture. Thus, rearranging, modifying or retrofitting the installation becomes significant undertaking because of the presence of the cement cap.

SUMMARY OF THE DISCLOSURE

Embodiments of the present disclosure provide a ground mounting assembly for mounting a structure, such as a photovoltaic system mounted to a ground mounting assembly, methods for stabilizing a preinstalled ground mounting assembly and methods for ground mounting a structure, including; docks, wharfs, moorings, antennas and building reinforcement. Briefly described, the present disclosure can be viewed as providing permanent, semi-permanent and temporary, removable ground mounting assemblies, systems and methods for ground mounting structures utilizing posts having attached stabilizing plates for lateral and/or uplift, and/or downward forces.

In one aspect, the present disclosure provides a ground mounting assembly for mounting a structure, which includes one or a plurality of posts, each post being connected to at least one stabilizing element of any geometric shape which may take the form of a flat plat which may be fixed to or toggle mounted to the post, or for example a half-pyramid shaped structure, fixed to the post. A first portion of the one or more plurality of posts may define a front of the mounting assembly, and a second portion of the one or more plurality of posts may define a back of the mounting assembly. Where there is a plurality of posts, each of the front posts may be connected to an adjacent one of the back posts by a cross member.

In another aspect, the present disclosure provides a photovoltaic system, which includes a ground mounting assembly having one or a plurality of posts, each post being connected to at least one stabilizing element. Where there is a plurality of posts, at least two of the plurality of posts may be connected by a cross member, and a solar panel array may be mounted to the ground mounting assembly.

In a further aspect, the present disclosure provides a method of stabilizing a preinstalled ground mounting assembly having one or a plurality of posts buried at least partially in the ground. The method includes the steps of: excavating an area of ground surrounding each of the posts; attaching at least one stabilizing element to each of the posts, in an area exposed by the excavating; and backfilling the excavated area. The method may further include, where there are a plurality of posts: excavating a portion of ground between posts defining a front of the mounting assembly and posts defining a back of the mounting assembly; and attaching a cross member between each of the front posts and an adjacent one of the back posts.

In yet another aspect, the present disclosure provides a method of ground mounting a structure, including the steps of: forming a mounting assembly by driving one or a plurality of posts into the ground, each of the posts being connected to at least one stabilizing element; and attaching the structure to an above-ground portion of the mounting assembly. The method may further include the steps of, where there are a plurality of posts: excavating an area of ground between posts defining a front of the mounting assembly and posts defining a back of the mounting assembly; attaching a cross member between each of the front posts and an adjacent one of the back posts; and backfilling the excavated area.

In yet another aspect, the present disclosure provides a flush to the ground or near flush to the ground mounting assembly with swiveling cap attachment for structural cables, ropes or chains to tension or tie down permanent, semi-permanent or temporary structures such as fabric roof structures, tents, awnings and other architectural structures and elements that may rotate, flex or pull in multiple directions. This may be due to design of an architectural element that moves, or under differing weather conditions the structure moves, also per time of year, season, temperature, wind direction etc.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A-7C are rotated perspective views of one alternative embodiment of posts in accordance with the present disclosure.

FIGS. 8A-8B are side elevational views, and FIG. 8C is a perspective view, respectively, of yet another alternative embodiment of posts in accordance with the present disclosure.

FIG. 10E is a flow chart showing a process of installing and stabilizing the post in accordance with FIGS. 9A-10D.

FIGS. 16A through 16C are top views thereof.

FIGS. 28, 28A, 28B, 28C, and 29 are further depictions of the described disclosure for use as ground anchors that can be manually installed with a hammer and nest together when not in use for ease of storing and transporting.

DETAILED DESCRIPTION OF THE DISCLOSURE

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Figure 1:
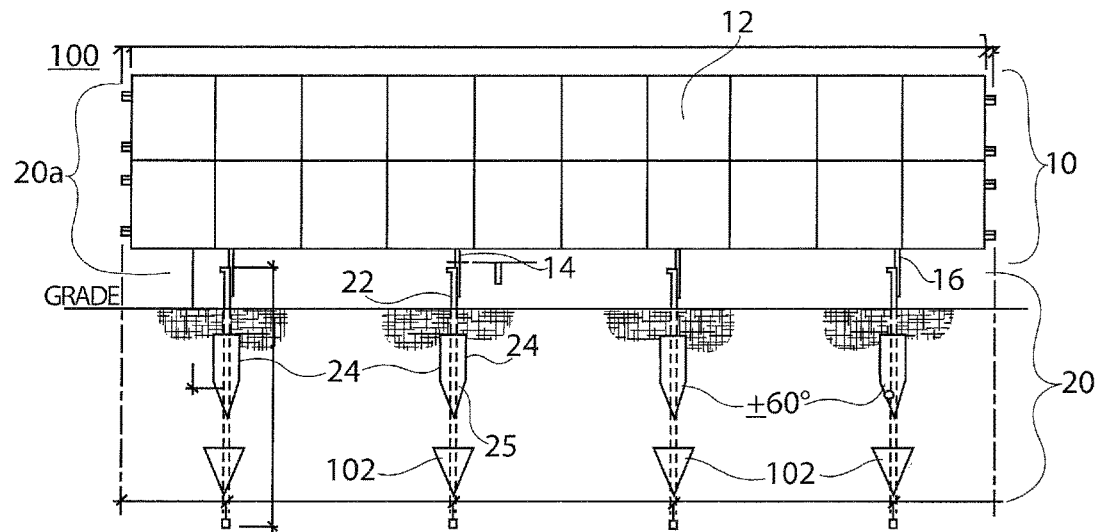
FIG. 1 is an illustration of a side plan view of a photovoltaic (PV) system above and below grade, in accordance with an exemplary embodiment of the disclosure.

FIG. 1 is an illustration of a front elevation view of a photovoltaic (PV) system 10, in accordance with a first exemplary embodiment of the disclosure. The system 10 includes a solar panel assembly 10 and a mounting assembly 20. The solar panel assembly 10 may include an array of solar panels 12, which may be physically joined to one another, as well as electrically connected.

Figure 2:
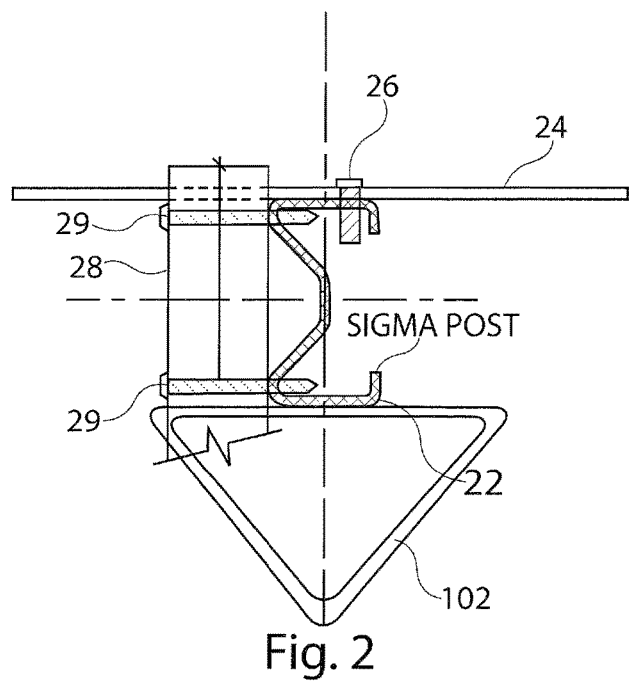
FIG. 2 is an illustration of a plan section at a Sigma post, taken along line 14 of FIG. 1, in accordance with an exemplary embodiment of the disclosure.

The mounting assembly 20 includes a plurality of posts 22. In one embodiment posts 22 may be any pile, pole, stake, or any similar structure which may be positioned at least partially underground, and fixed firmly in an upright position. In one embodiment posts 22 may be sigma posts (as shown in the plan section of FIG. 2).

One or more stability elements 24 are attached to each post 22. The stability elements 24 may take the form of flat plates, and may be made, e.g. of galvanized steel. The elements or plates 24 may be of any dimensions, depending on the desired stability and/or the type of structure to be mounted onto the mounting assembly 20. As shown in FIG. 1, the plates 24 may be approximately 12"×24"×3/16". Preferably, the stability plates 24 include angled lower corners 25. The lower corners 25 may have an angle of about 45° to 75°, preferably about 75° from the horizontal plane, as shown in FIG. 1. The angled corners 25 allow the plates 24, for example when attached to posts 22, to be more readily driven into the ground. The plates 24 are attached to the posts 22 by any known attachment techniques, including welding, epoxies or other adhesives, rivets, screws, nuts and bolts or any other structural fastener, and the like. As shown in the plan section of FIG. 2, taken along line 14, the plates 24 may be attached to the post 22 with a bolt 26. Also, if desired, one or more half pyramid-shaped stabilizing elements or pyramid scoops 102, as shown in greater detail in FIGS. 8A-8C may be attached to the post 22.

Depending on the characteristics of the structure to be mounted, the position of attachment of the stability plates 24 and pyramid scoop 102 to the posts 22, as well as the underground depth of the plates 24, and pyramid scoop 102 may vary. As shown in FIG. 1, the structure to be mounted may be a solar panel assembly 10. For such a solar panel assembly 10, the stability plates 24 may preferably be attached to the posts 22 and buried to a depth of about 2' from grade to the top of the plates 24, with the pyramid scoops 102 below stability plates 24 as shown in FIG. 1. For example, posts 22 may be about 10' in height, with an embedment depth of about 8'4" and an above-ground height of about 1'8". The stability plates 24 may be positioned underground such that the flat surface of the plates 24 faces the same direction as the vertical component of the solar panels 12 of the assembly 10, as shown by the arrows in FIG. 4. That is, the buried flat surface of the plates 24 may face the same direction as the wind-bearing vertical component of the above-ground photovoltaic surface, thus providing underground resistance to prevent or minimize movement both horizontally and vertical uplift of the posts as the solar panels 12 are subjected to wind, or hurricanes, or seismic events. (see FIGS. 3 and 4).

Figure 3:
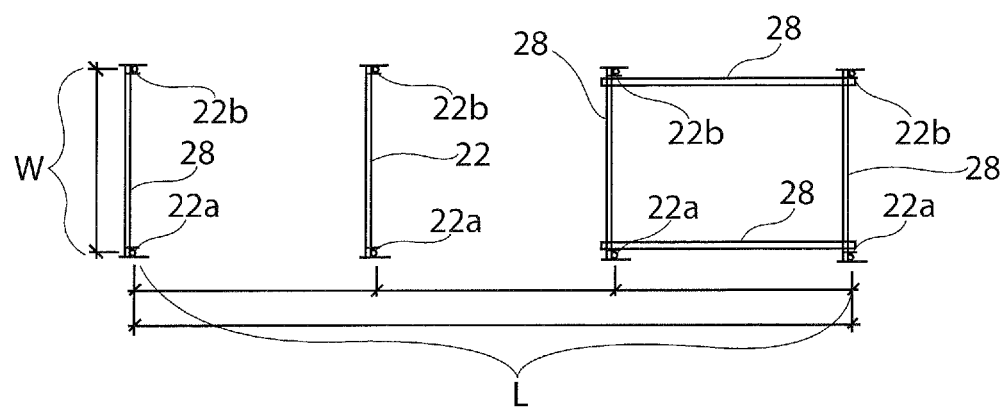
FIG. 3 is an illustration of an overhead plan view of the system shown in FIG. 1, in accordance with an exemplary embodiment of the disclosure.

As shown in the plan view of FIG. 3, the posts 22a and 22b of the mounting assembly 20 may be arranged in a rectangular fashion, with a first set of posts 22a defining a front of the assembly 20 and a second set of posts 22b defining a back of the assembly 20. A length (L) of the assembly 20 may be defined by the total distance between front posts 22a or back posts 22b, while the width (W) of the assembly 20 may be defined by the distance between adjacent front 22a and back 22b posts. Other geometric patterns may be produced from the positioning of the posts, depending on the shape and mounting positions of the structure to be mounted, as those having ordinary skill in the relevant field will readily understand.

The posts 22a and 22b may be attached to each other with cross members 28, thereby providing further structural strength and stability to the mounting assembly 20 and the system 10. Cross members 28 also can be attached side to side to provide additional stability (see FIG. 3). The cross members 28 may be any type of attachment member for providing stability and/or structural strength when attached between two or more posts 22a and 22b. For example, the cross members 28 may be a rigid structure, such as a pole or angle. The cross members 28 may be 2"×2"×3/16" galvanized tube steel.

Figure 4:
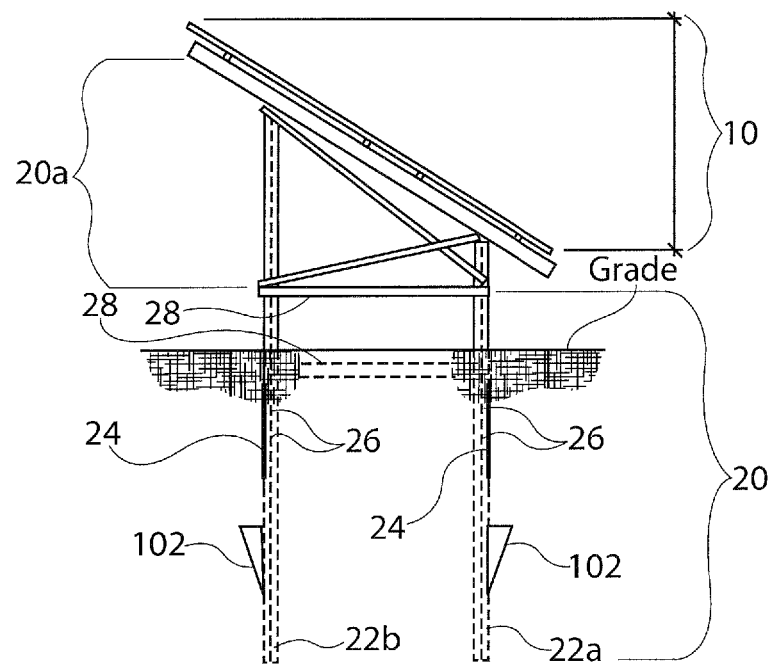
FIG. 4 is an illustration of a side view above and below grade of the system shown in FIG. 1, in accordance with an exemplary embodiment of the disclosure.

As shown in the side elevation view of FIG. 4, the cross members 28 may be attached to the posts 22a and 22b underground (e.g., at a position above, below or near the position of the plates 24 attached by bolts 26) and/or above ground. The cross members 28 may be attached to the posts 22a and 22b before or after installing the posts 22a and 22b in the ground. Additionally further stabilization components similar to items 102 may be attached to the posts prior to installation to facilitate increased resistance to pulling forces, such as upside down pyramid shaped scoops shown as 102 to resist upward pulling forces. For installation slots may be dug into the ground, into which the cross members 28 and posts 22 a and 22b may be positioned, and then backfilled. The cross members 28 may be attached to the post 22a and 22b by any known attachment techniques, including welding, rivets, epoxies or other adhesives, screws, nuts and bolts or any other structural fastener, and the like. For example, the cross members 28 may be attached to the post 22a and 22b with two self-drilling truss-head screws.

The cross members 28 may attach posts 22a and 22b in pairs, as shown in FIG. 3. The cross members 28 may attach posts 22a and 22b along an axis orthogonal to the flat surface of the plates 24 (e.g., as shown in FIG. 3, the cross members 28 attach front posts 22a to back posts 22b along an axis orthogonal to the surface of the plates 24). By attaching cross members 28 to posts 22a and 22b orthogonal to the plane of the surface of the plates 24, stability to the mounting assembly 20 is provided to the system 100 to counter wind against the face of the solar panel assembly 10. A structure to be mounted, such as the solar panel assembly 10, may be of a size such that it may be desirable to form the mounting assembly 20 of two or more pairs of posts 22a and 22b (e.g., Two pairs of posts 22a and two pairs of post 22b, as shown in FIG. 3). However, the mounting assembly 20 may include any number of posts 22a and 22b, and may include cross members 28 which may attach posts 22a and 22b in any direction, for example, front posts 22a to adjacent back posts 22b, front 22a to front 22a, back 22b to back 22b, as well as front posts 22a to non-adjacent back posts 22b.

The solar panel assembly 10 may be mounted to the mounting assembly 20-20a, for example, by attaching mounting posts 16 of the solar panel assembly 10 to above-ground portions of the posts 22a and 22b of the mounting assembly 20. While the mounting assembly 20-20a has been described primarily with respect to mounting a solar panel assembly 10, any other assembly may be mounted to the mounting assembly 20 of the present disclosure. For example, the mounting assembly 20 may be used for mounting other types of photovoltaic systems, including PV concentrators and mirror assemblies, as well as billboards, signs, buildings, or any other structure which may be subjected to seismic action winds and relevant anticipated structural loads Existing mounting structures may be retrofitted for stability utilizing principles provided by the present disclosure. For example, an existing mounting structure for a photovoltaic system may include posts 22a and 22b which have previously been driven into the ground, and to which a solar panel assembly 10 has been attached. To provide increased stability, particularly in loose or sandy soil, plates 24 may be attached to the posts 22a and 22b. In order to attach the plates 24, an area of ground surrounding the posts 22a and 22b may be dug out, for example to a depth of about 3 feet. Plates 24 may then be attached to the posts, for example with stainless steel or corrosion resistive bolts 26. For further stability, cross members 28 may be attached between adjacent front 22a and back 22b posts, for example, by digging a trench between posts 22a and 22b, attaching cross members 28, and backfilling the trenches.

Figure 5:
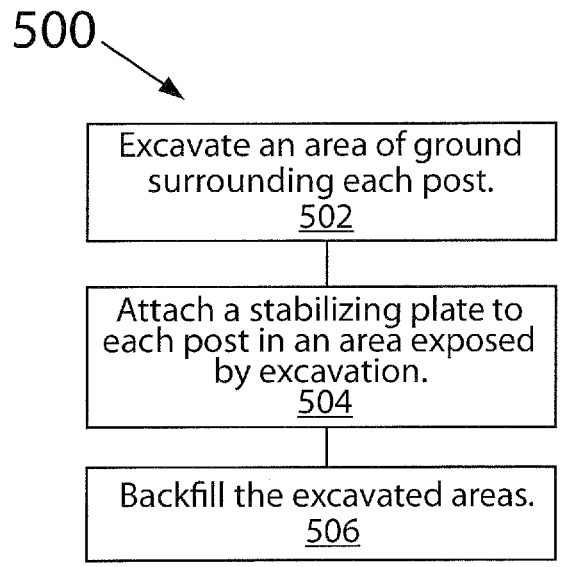
FIG. 5 is a flowchart illustrating a method of stabilizing a preinstalled ground mounting assembly, in accordance with an exemplary embodiment of the disclosure.

FIG. 5 is a flowchart 500 illustrating a method of stabilizing a preinstalled ground mounting assembly having a plurality of posts 22a and 22b buried at least partially in the ground, in accordance with an embodiment of the disclosure. As shown by block 502, an area of ground surrounding each of the posts 22a and posts 22b is excavated. At block 504, a stabilizing plate 24 is attached to each of the 22a and 22b posts, in an area exposed by the excavation. At block 506, the excavated area is backfilled. The stabilizing plates 24 may be attached to the posts 22a and 22b at a position such that the top edge of the stabilizing plates 24 is buried to a depth of 1 foot or greater underground.

The method may further include excavating a portion of ground between posts 22a defining a front of said mounting assembly and posts 22b defining a back of the mounting assembly 20, and attaching a cross member 28 between each of front posts 22a and an adjacent one of the back posts 22b.

Figure 6:
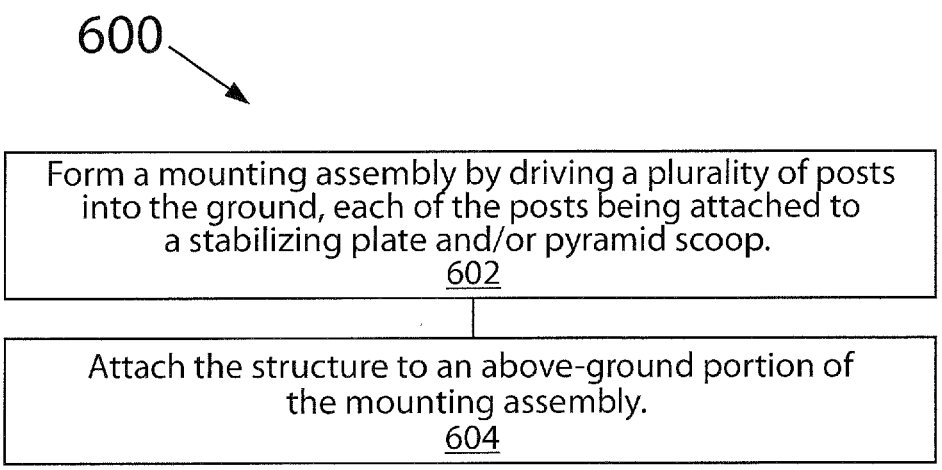
FIG. 6 is a flowchart illustrating a method of ground mounting a structure, in accordance with an exemplary embodiment of the disclosure.

FIG. 6 is a flowchart 600 illustrating a method of ground mounting a structure. As shown by block 602, a mounting assembly 20 is formed by driving a plurality of posts 22a and 22b into the ground, each of the 22a and 22b posts being connected to a stabilizing plate 24 and optionally a scoop pyramid—102. At block 604, the structure is attached to an above-ground portion of the mounting assembly 20. Each of the 22*a* and 22*b* posts may be driven into the ground to a position such that the stabilizing plates 24 are buried to a depth of about 2 feet underground. The structure may be a solar panel array 10.

The method may further include excavating an area of ground between posts 22*a* defining a front of the mounting assembly 20 and posts 22*b* defining a back of the mounting assembly 20, and attaching a cross member 28 between each of the front posts 22*a* and an adjacent one of the back posts 22*b*, and backfilling the excavated area.

Figure 9E:
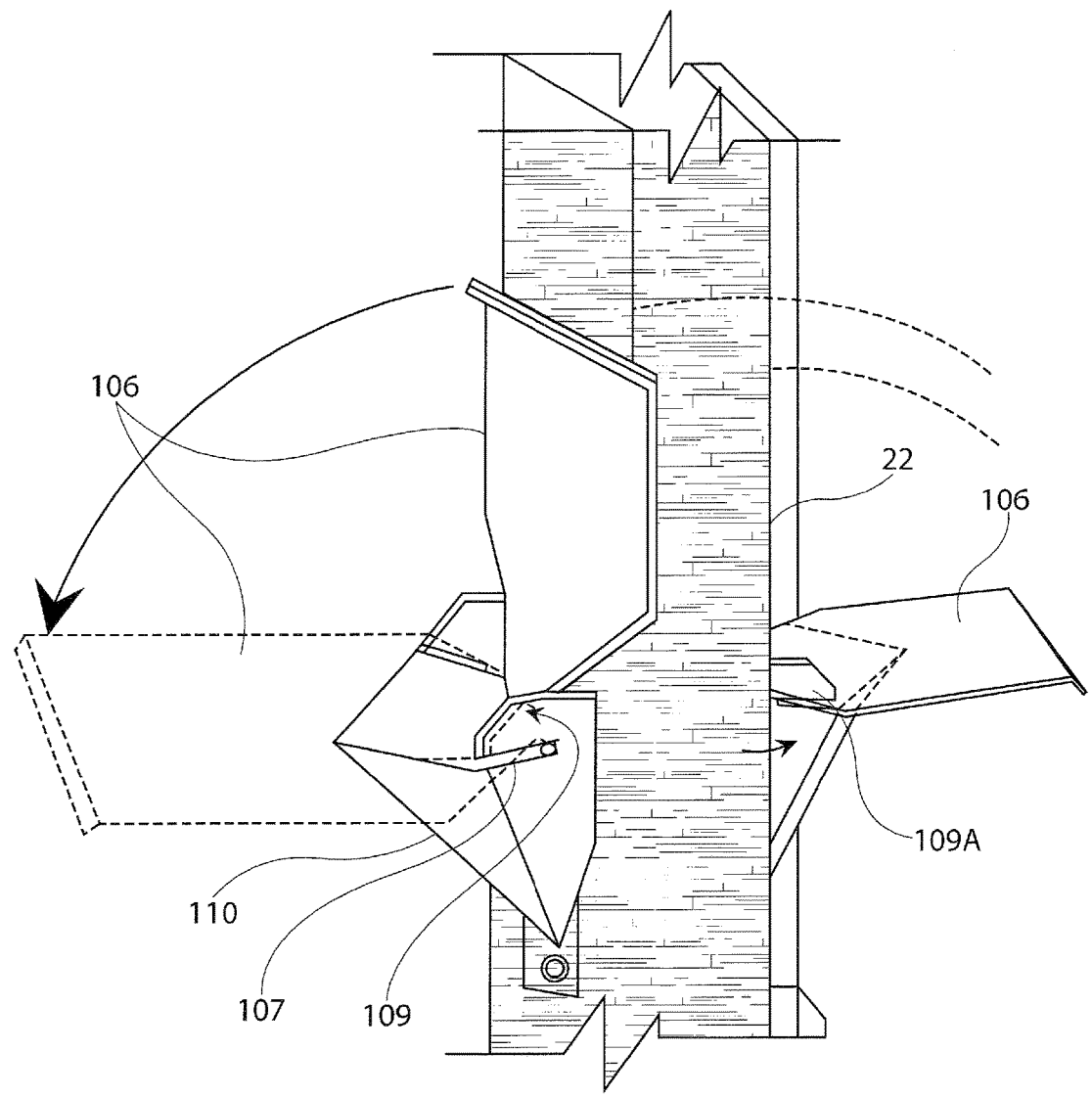
FIGS. 9A-9D are side elevational views and FIG. 9E an enlarged perspective view of yet another alternative embodiment of posts of the present disclosure showing the use of the locking mechanism.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. For example, as illustrated in FIGS. 7A-7C, the piles or posts 100A, 100B, 100C may have different cross-sections, and may have multiple plates 102 and 102*a* half-pyramid scoops mounted thereon. Alternatively, as shown in FIGS. 8A-8C, one or more additional stabilizing elements in the form of a half pyramid-shaped structure 102*a* may be fixedly mounted, using, for example, mounting plates 104, to the posts whether 22*a* or 22*b* for stabilizing the structure against uplift, twisting, vertical loads, and resistant strength. In such embodiment, the half pyramid-shaped stabilizing elements or pyramid scoops preferably are fixed to the lower half of posts 22*a* and 22*b*, but can be placed anywhere along the post to maximize its uplift twisting and vertical loads and resistant strength. In still yet another embodiment, shown in FIGS. 9A-9D, the stabilizing elements may take the form of toggle mounted anchor plates 106 which are pivotably mounted to posts 22*a* and 22*b* around a pivot 108. In the case of pivotably mounted stabilizing elements or plates 106, the post typically will be driven in the ground below a target position, e.g. as shown in FIGS. 9A and 9B. The posts would then be pulled vertically into a final position causing the toggle mounted plates 106 to fan out against a stop plate 110 which, in a preferred embodiment, comprises a half pyramid-shaped element. Alternatively, as shown in FIG. 9E, toggle mounted plates 106 may be sufficiently strong so that when the plates are slid into slots 107 in brackets or slotted stoppers and flexible locking mechanism 109, the tail ends of the plates bend backwards against themselves, and in concert with slots 107, lock the plates 106 against both upwards and downwards pressure and force by tabs 109A. Once locked in place, plates 106 have the capacity to resist both upward and downward motion on the pile.

Figures 10A, 10B:
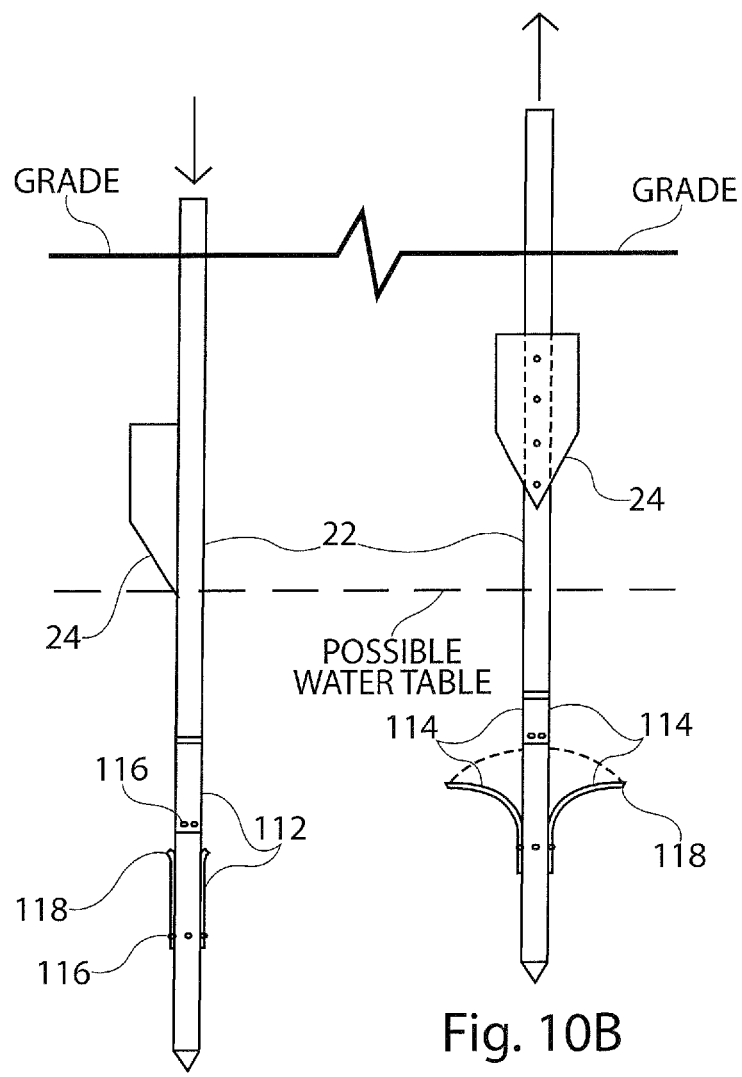
FIGS. 10A-10B are side elevational views, FIG. 10C a perspective view and FIG. 10D a top view of still yet other alternative embodiments of posts of the present disclosure.

In yet another alternative, as shown in FIGS. 10A and 10B, the stabilizing elements may take the form of bendable plates 112 having reduced resistance bending points 114, fixed to post 22 adjacent their lower ends by fasteners 116. The upper, free ends 118 of plates 112 preferably are curved outwardly by lifting the pile upward. Alternatively, as shown in FIGS. 10C and 10D, the plates 112 may be pivoted and locked in position in slots 113 in bracket plates 111. The right-hand side of post 22 in FIG. 10C depicts the plate 112 deployed within the slots 113 whereas the left-hand side of post 22 depicts the plate 112 not deployed, in an upright abutting position to the post 22. Preferably slots 113 are slightly curved to maintain plates 112 by frictional engagement. Additionally, the locking portion of the bracket plate 111, i.e., the portion of the bracket plate 111 having the slots 113, may be flexible and spring like such that it can be biased outwards by plate 112 as upward force is applied and will snap back to an unbiased position to lock the plate 112 within the slot 113, as shown in FIG. 10D. The disclosure also advantageously may be used with solar thermal energy systems, docks, wharfs, buildings, and moorings.

FIG. 10E is a flow chart showing a process of installing and stabilizing the post in accordance with FIGS. 9A-10D. Step 1 is used to assemble and attach ground stabilizing or other plates 24 to the pile or pole. Next the pile or pole is driven to the desired depth as step 2. In step 3 the pile or pole is driven upward to deploy stabilizing plates shown as 106 in FIGS. 9A-9E, and shown as 112 in FIGS. 10A-10D. This motion locks the stabilizing plates into a deployed position at the desired depth. Then the piles or poles are ready for use as step 4.

Figure 11G:
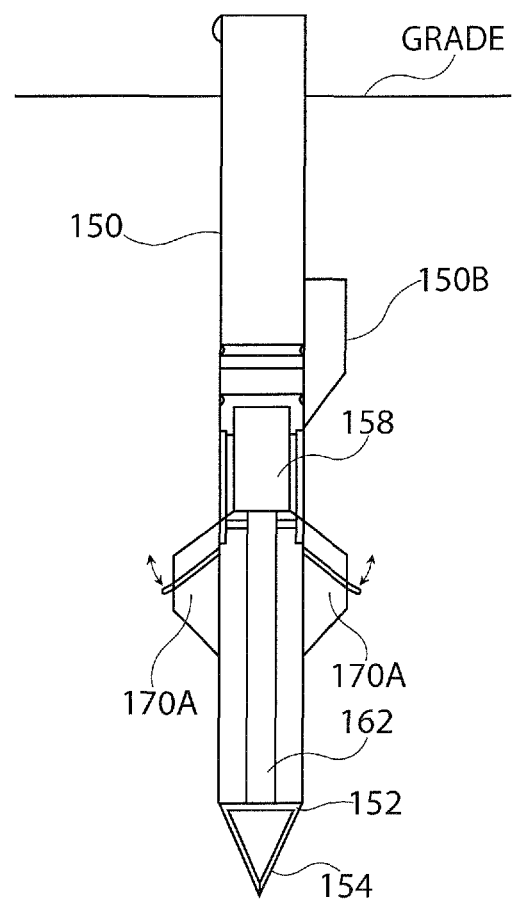
FIGS. 11A-11N are side elevational and top end views of yet other alternative embodiments of post of the present invention.
Figure 11H:
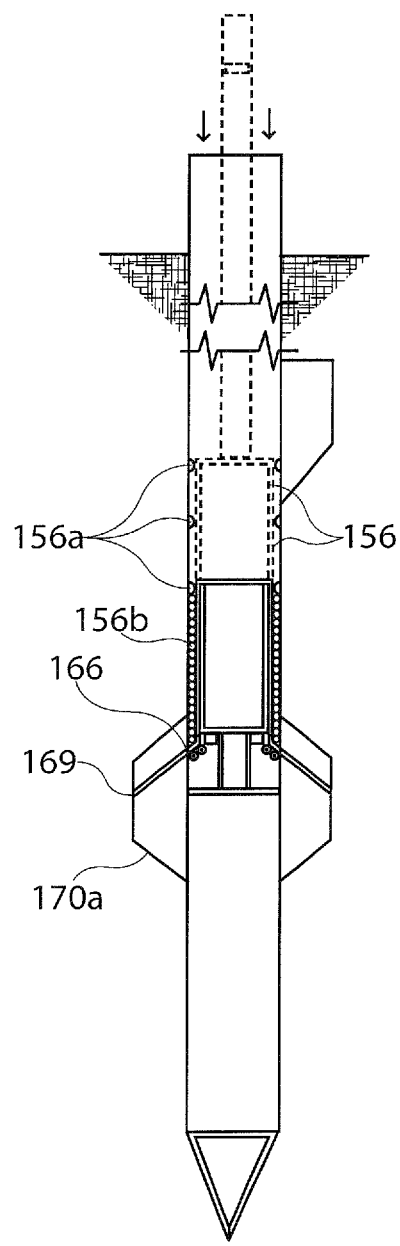
Figure 11I:
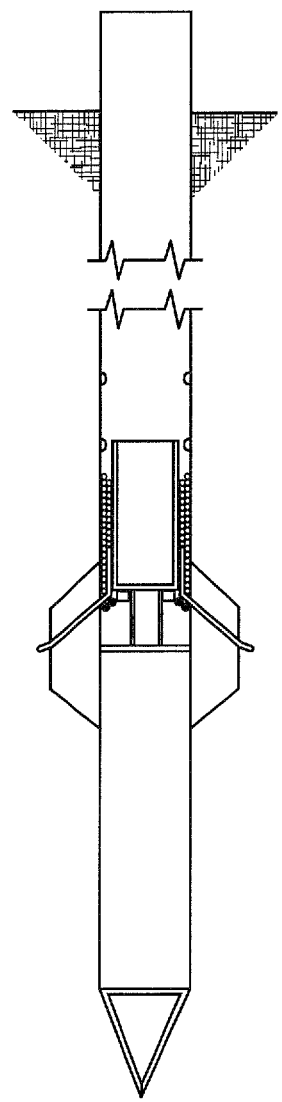
Figure 11M:
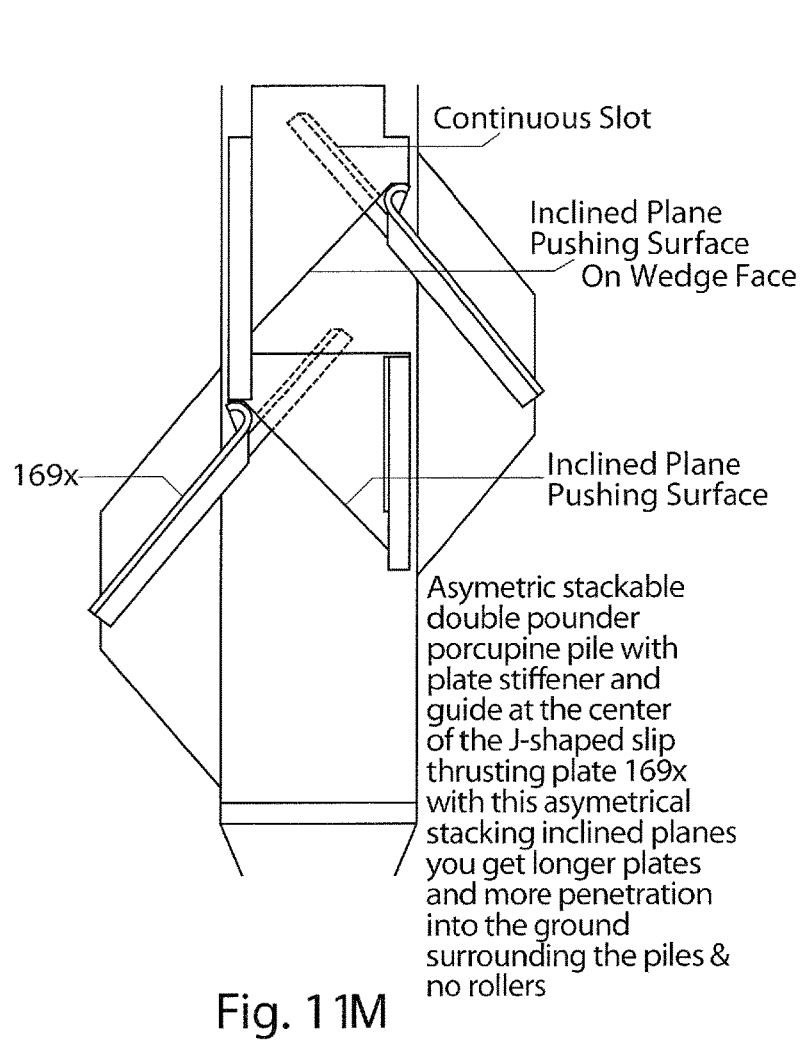
Figure 11N:
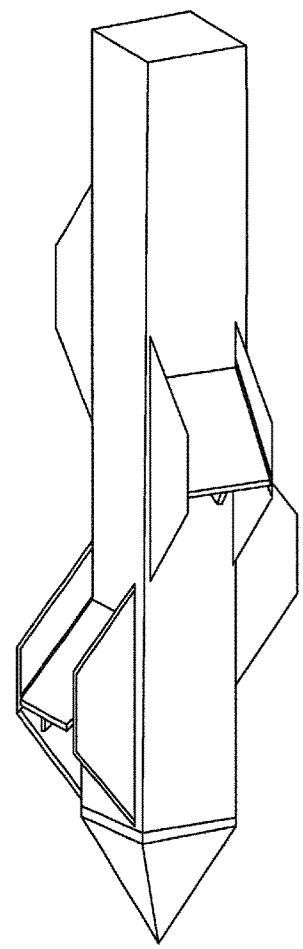

Referring now to FIGS. 11A-11N, in yet another embodiment of the invention, the pole comprises a double pounder pile driven mono pole comprising an elongate hollow pole 150, preferably having a square cross section, capped at its distal end 152 by a pyramid-shaped point 154. The double pounder pile driven mono pole 150 includes a follower guide 158 that is mounted to the top plate 160 forming the pyramid point 154 via steel tube spacer 162 which may vary in length (see FIG. 11G). The double pounder may be equipped with plates 150 B to resist lateral load (See FIGS. 11E and 11G). Also, as shown in FIG. 11G, the double pounder can be positioned at any place along the pile. Soils are stratified. Thus, it is desirable to have the plates come out at a soil depth where the stabilizers produce the strongest resistive force to motion stress and loads. The double pounder design allows the versatility needed to achieve the maximum holding surface possible. The double pounder also allows one to vary the length and the size of the plates dependent on soils and structural needs. It can be placed anywhere along the pile. As shown in 11H as the grooved winglets 170A are enlarged and the hollow box ram 156 enlarged, the spacer half round sleeve guides 156*a* are increased, the number of rollers or ball bearing are increased 156*b*, and the steel plates 170 are increased in length. Also, most specifically shown in FIG. 11C, stabilizing plates 164 which may be needed during the double pounding of the pile for its initial installation, however they do not need to stay in the final position, and they can be removed. They are only there so that the pile doesn't get driven down deeper than what the desired engineering requirements are. Also, it should be noted that plates 150B may be placed anywhere along the double pounder for a maximum stability. Also, as shown in FIG. 11G, the grade stabilizer plates may be omitted when the barge or pile driving rig is providing the stabilizing element.

The double pounder can also take on another form, as shown in FIGS. 11I through 11N. This double pounder is noted as the porcupine double pounder where multiple struts and plates are required to stabilize the mono pole or multiple pile structure. The same procedures are followed as noted in FIG. 11A through 11I. However, instead of 1 or 4 plates released along the pile, multiple struts and plates are deployed by double pounding the connected wedges inside the pile and pounding out the multiple porcupine plates. These multiple plates can be deployed in two opposing directions, combined with plungers or rams 1002 having or more wedge faces 1004, driven by a pile driver 1006, FIG. 11J to FIG. 11N, or at 180° different positions, to create a multiple porcupine pile that can integrate not only downward forces in a scoop downward fashion, but can be combined with pyramid upward installation to create a maximized pile in all directions. For greater penetration into the sub-soil the porcupine stackable double pounder can be arranged with single sided inclined plane pushing surfaces or wedge faces as shown in FIG. 11M with the central stiffening guide 169X, the grooved winglets and no rollers just lubricated J-shaped slip plates 169 shown in FIG. 11M and further shown deployed in FIG. 11N.

Figure 12B:
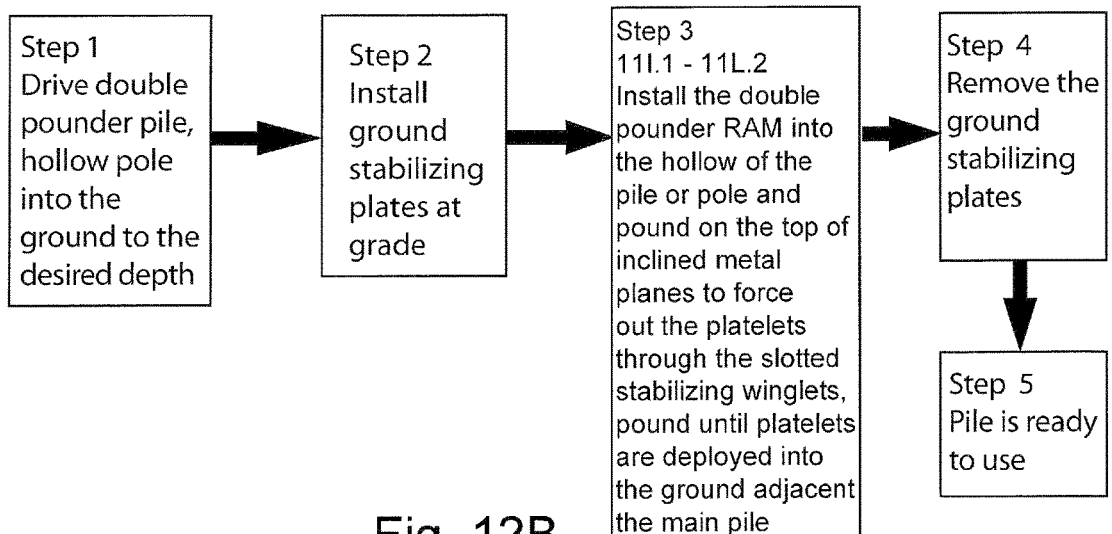
FIGS. 12A and 12B are flowcharts illustrating a method of installing and stabilizing the post of FIGS. 11A-11N.
Figure 12A:
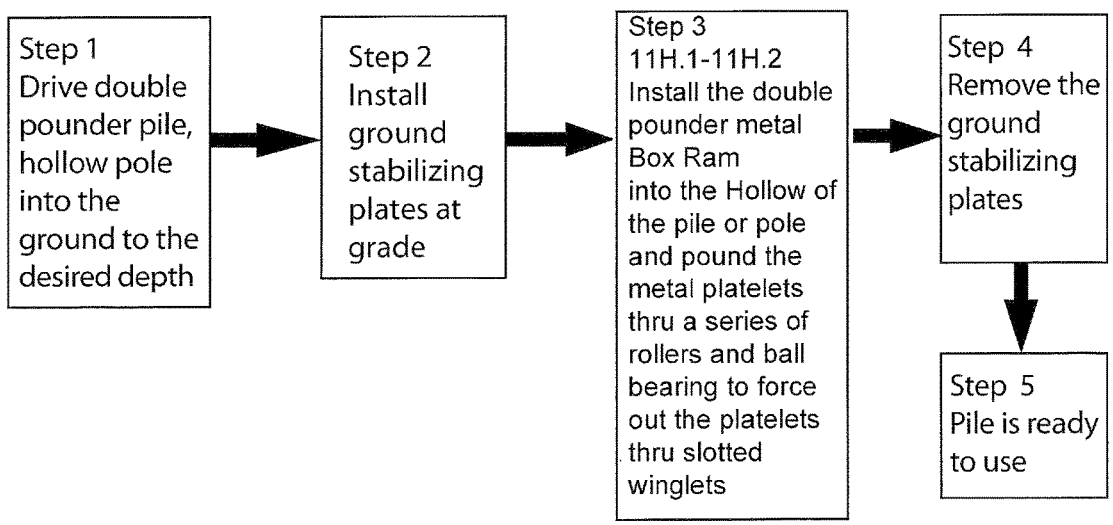

FIGS. 12A and 12B are flow charts of the installation steps needed for the double pounder. In use, the double pounder pile driven mono pole is driven into the ground to a desired depth using a conventional pole or pile driver in step 1. Then, in step 2 the pile is stabilized with above ground stabilizer plates 164. Next, a plunger 150 A or ram device is driven down the inside of pole 150, in step 3 or 3A, to drive steel plates 170 outward, over plate rollers 166 guided by retaining slots 170B in plates 170A, which may be lubricated, if desired, with an environmentally safe lubricant such as vegetable oil, wax, or the like, through slots 168 formed adjacent the distal end of pole 150, and guided through slotted winglets 169 in plates 170A (FIG. 11J) to provide for uplift and downward restraining baffles or wings. Then, as shown in step 4, remove the ground stabilizing plates and the pile is ready for use (Step 5).

Figure 13:
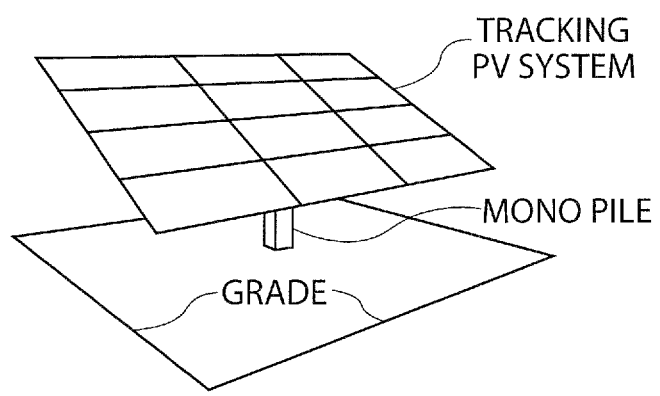
FIG. 13 is a perspective view of yet another embodiment of the present disclosure.
Figure 14:
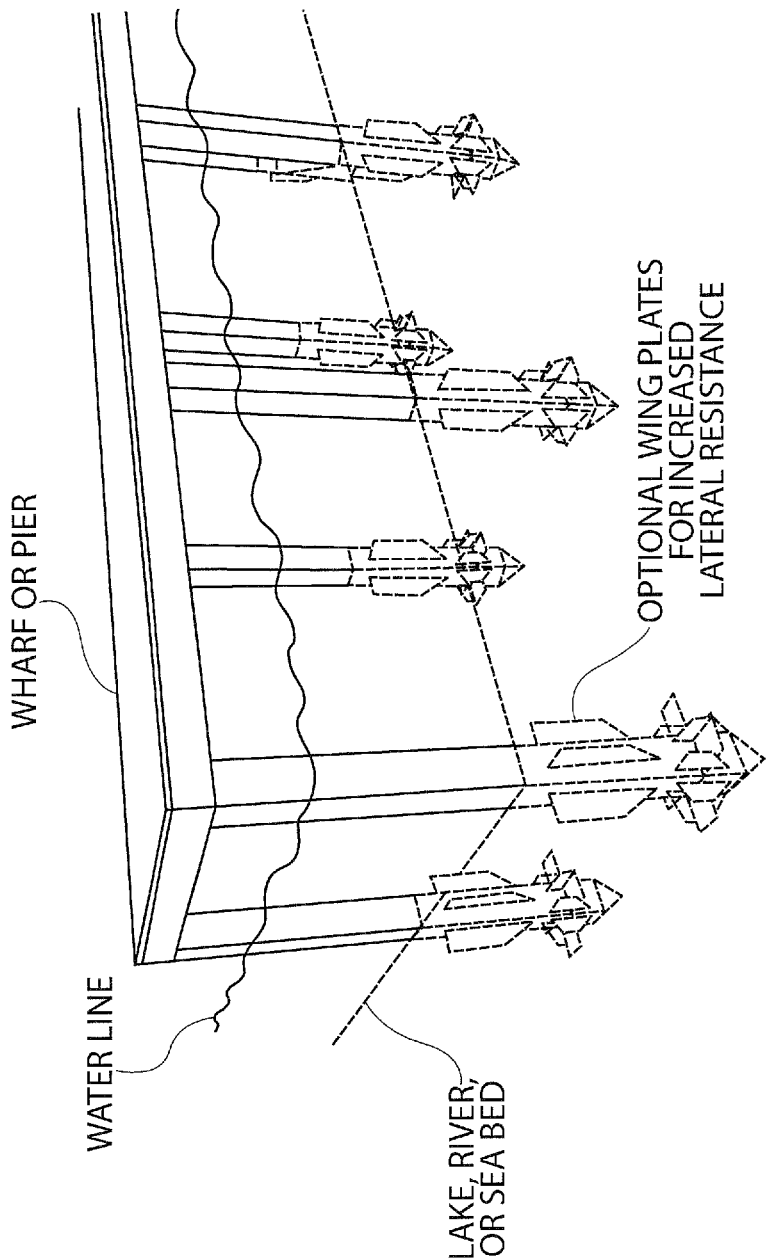
FIG. 14 is a perspective view of a wharf or pier in accordance with yet another embodiment of the present disclosure.

The double pounder pile driven mono pole may then be used in combination with other like or different poles such as previously described, or may be used alone for mounting PV systems such as shown in FIG. 13. The resulting mono pole with a solar panel array attached to it, is capable of counteracting significant loads, and offers significant advantages over conventional concrete spread footing which require steel reinforced concrete and anchor bolts especially in remote locations such as deserts or along power line easements (See FIG. 13), etc. Referring now to FIG. 14, in yet another embodiment of the invention, a dock or wharf may be mounted to a plurality of ground mounting poles as above described, in which the distal ends of the poles are driven into the lake, river or sea bed, while the proximal ends extend above the water, and a dock or wharf is mounted thereon.

Figure 15:
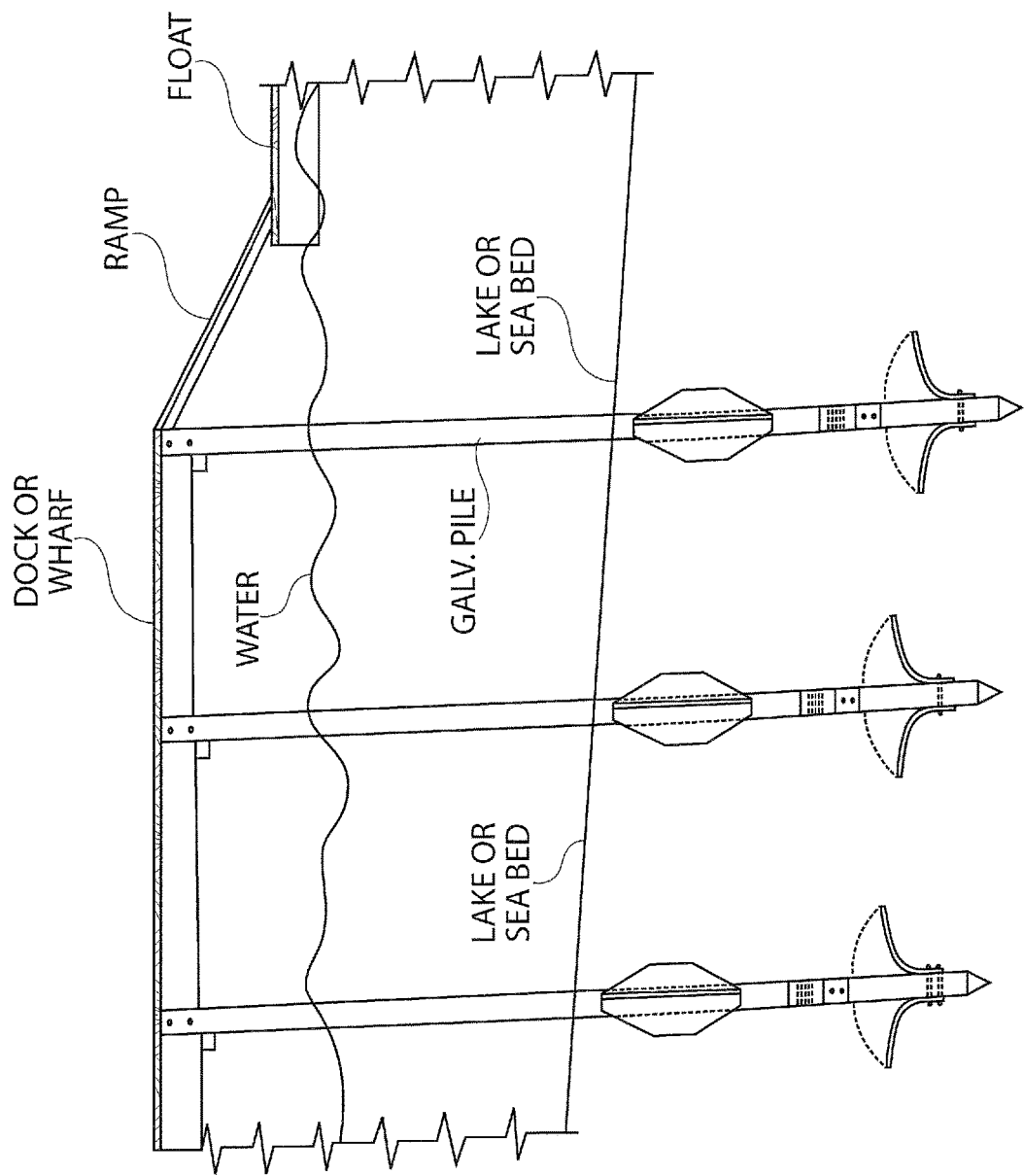
FIG. 15 is a view similar to FIG. 1 of a side elevation of a dock or wharf in accordance with another embodiment of the present disclosure.
Figure 15A:
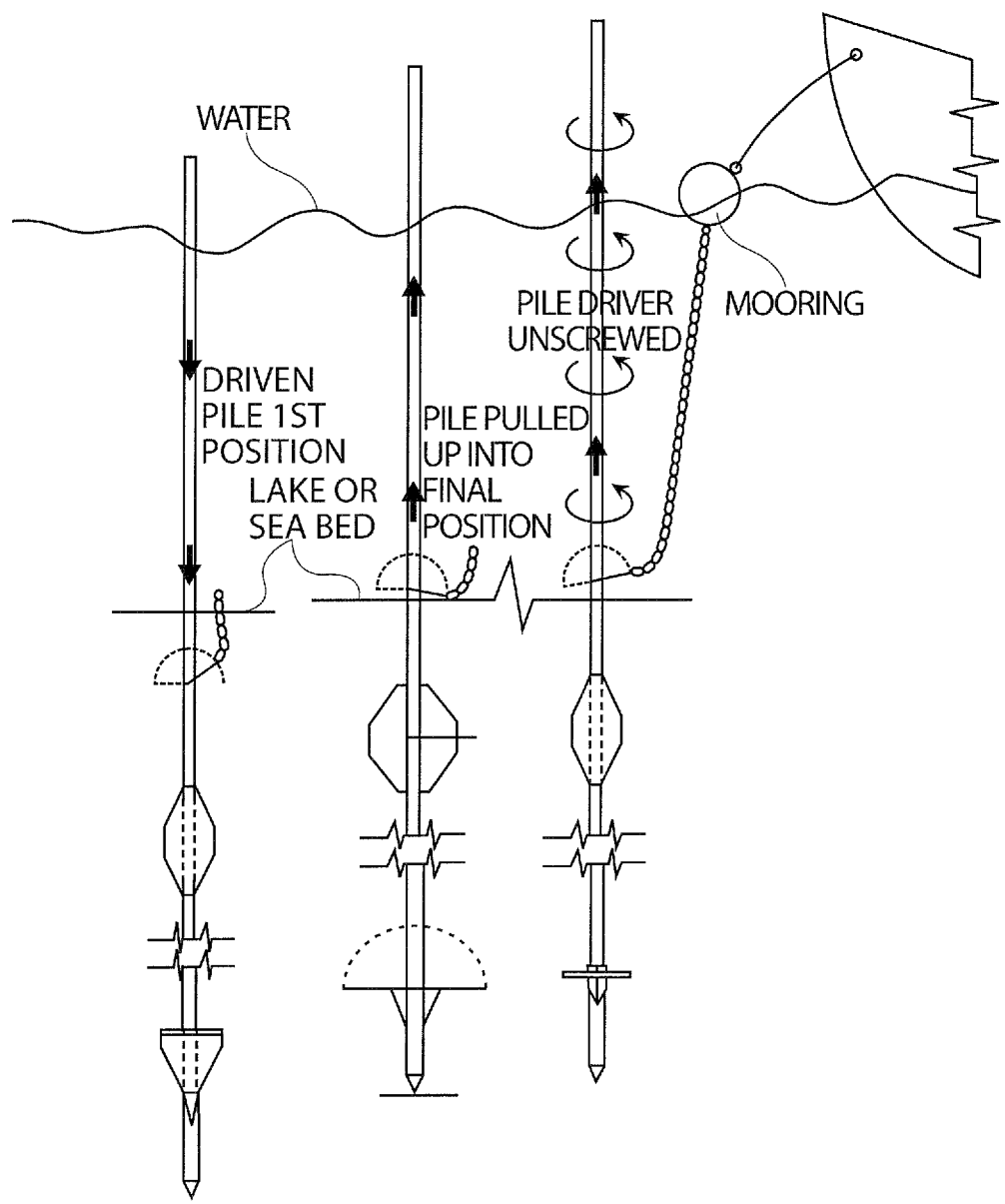
FIG. 15A is a view similar to FIG. 1 of a front elevational view of a mooring in accordance with yet another embodiment of the present disclosure.
Figure 15B:
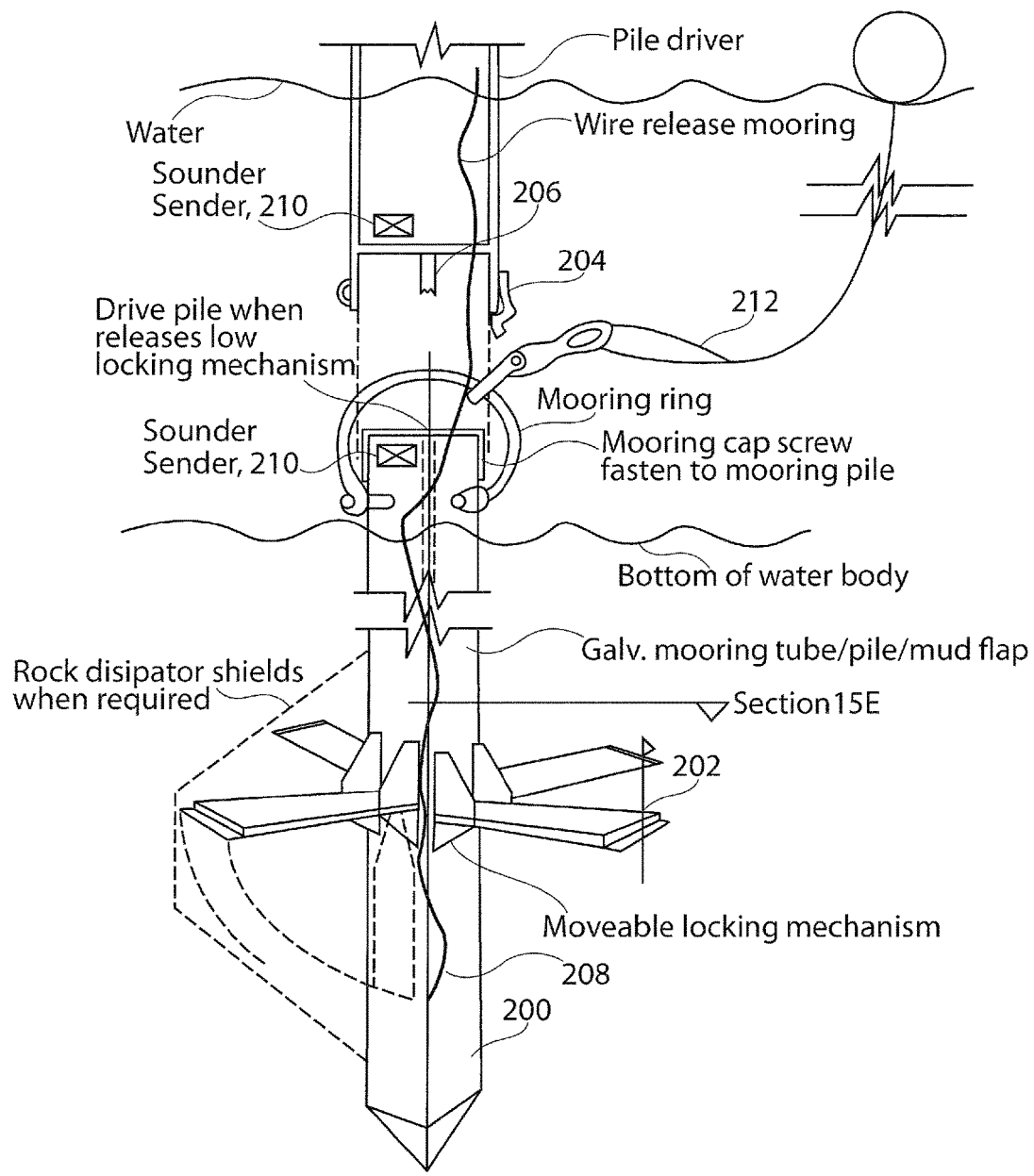
FIGS. 15B-15G illustrate alternative construction of mooring in accordance with the present disclosure.
Figure 15C:
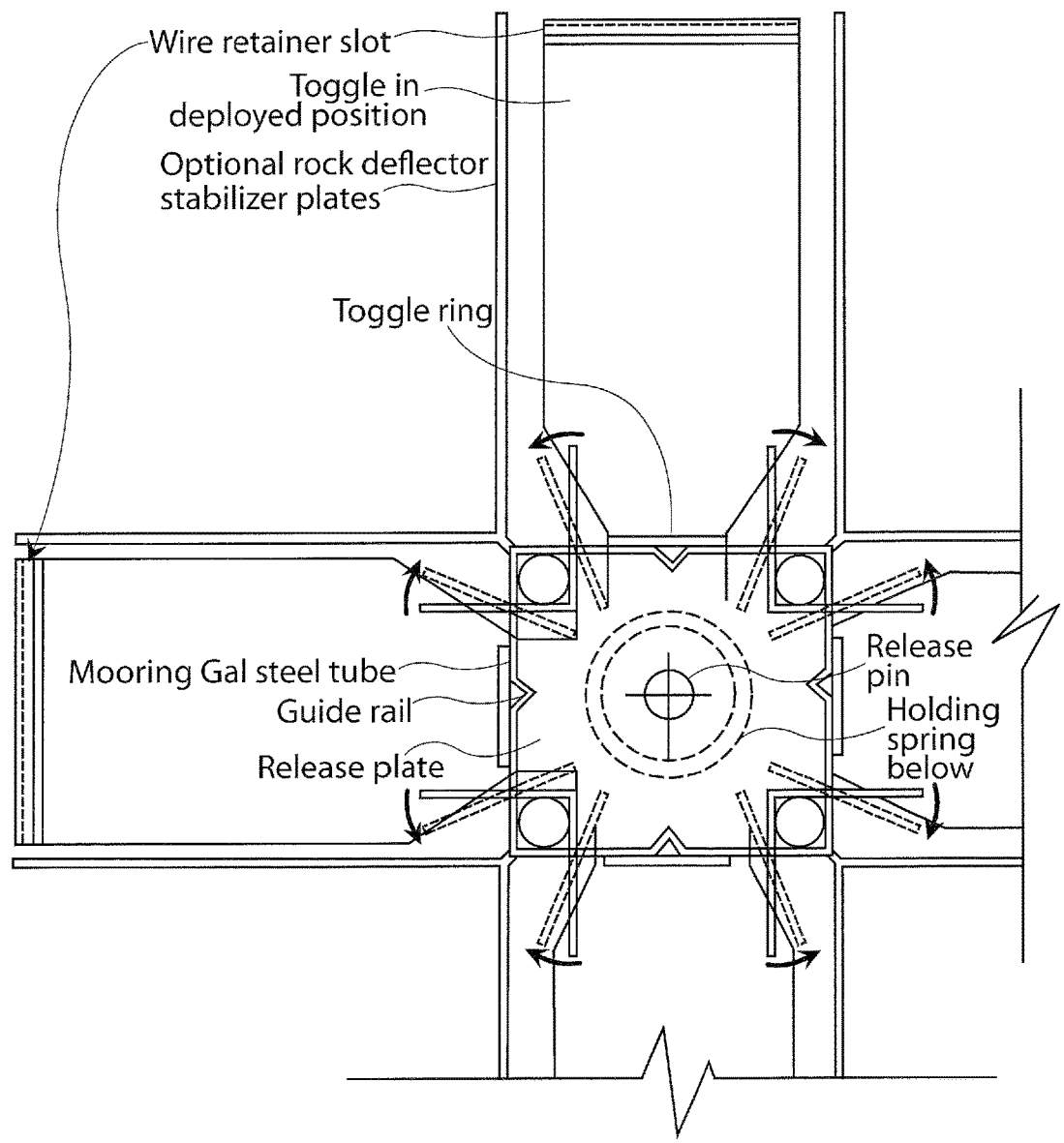
Figure 15D:
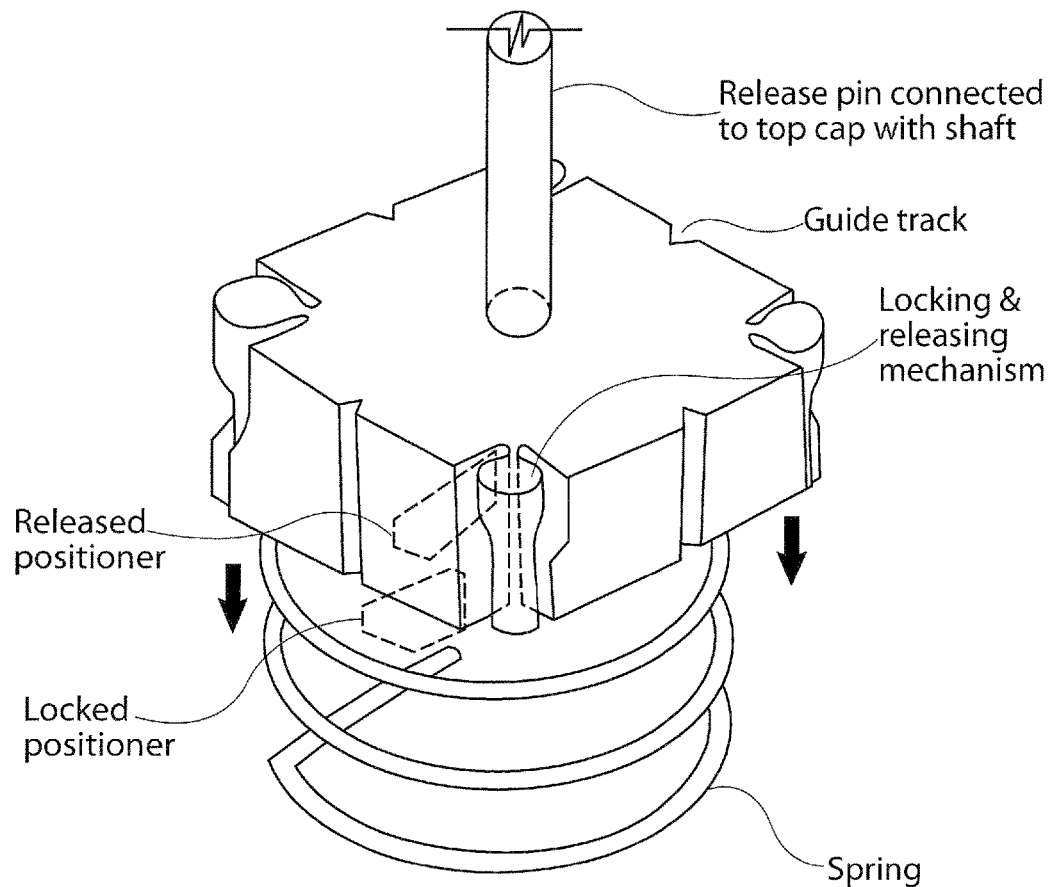
Figure 15E:
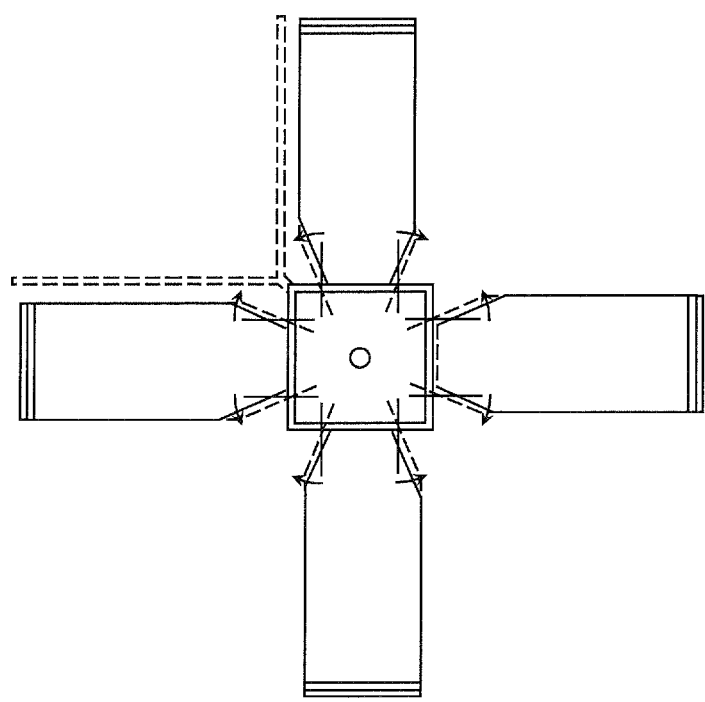
Figure 15F:
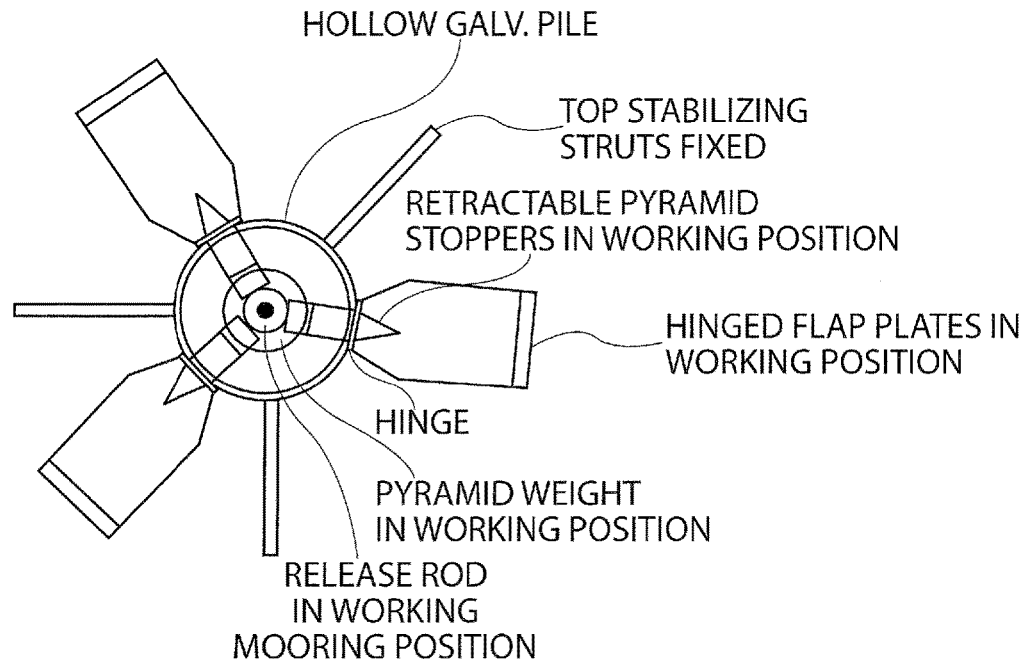
Figure 15G:
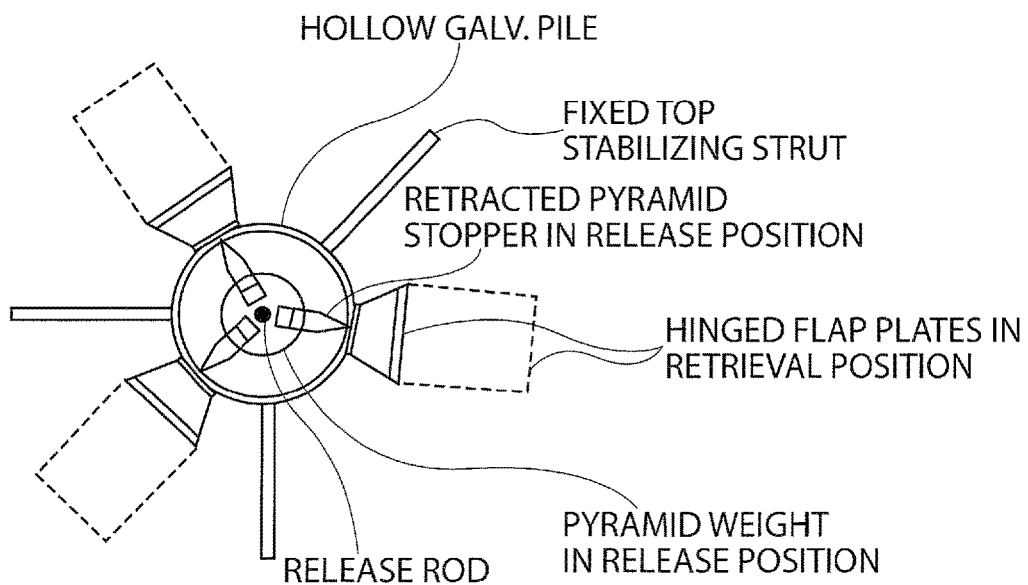
Figure 15H:
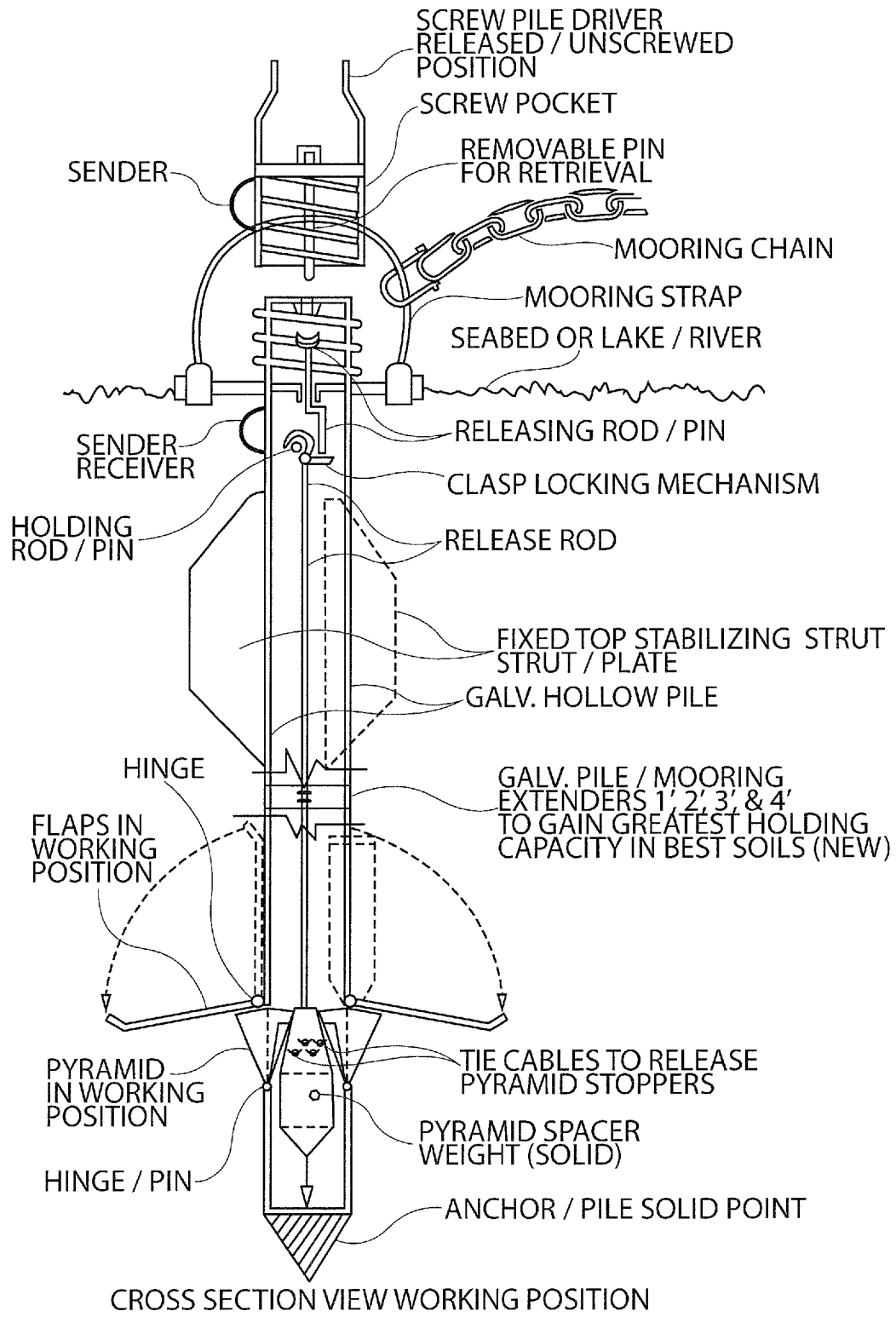
FIGS. 15H and 15I illustrate yet another alternative construction of a mooring in accordance with the present disclosure.
Figure 15I:
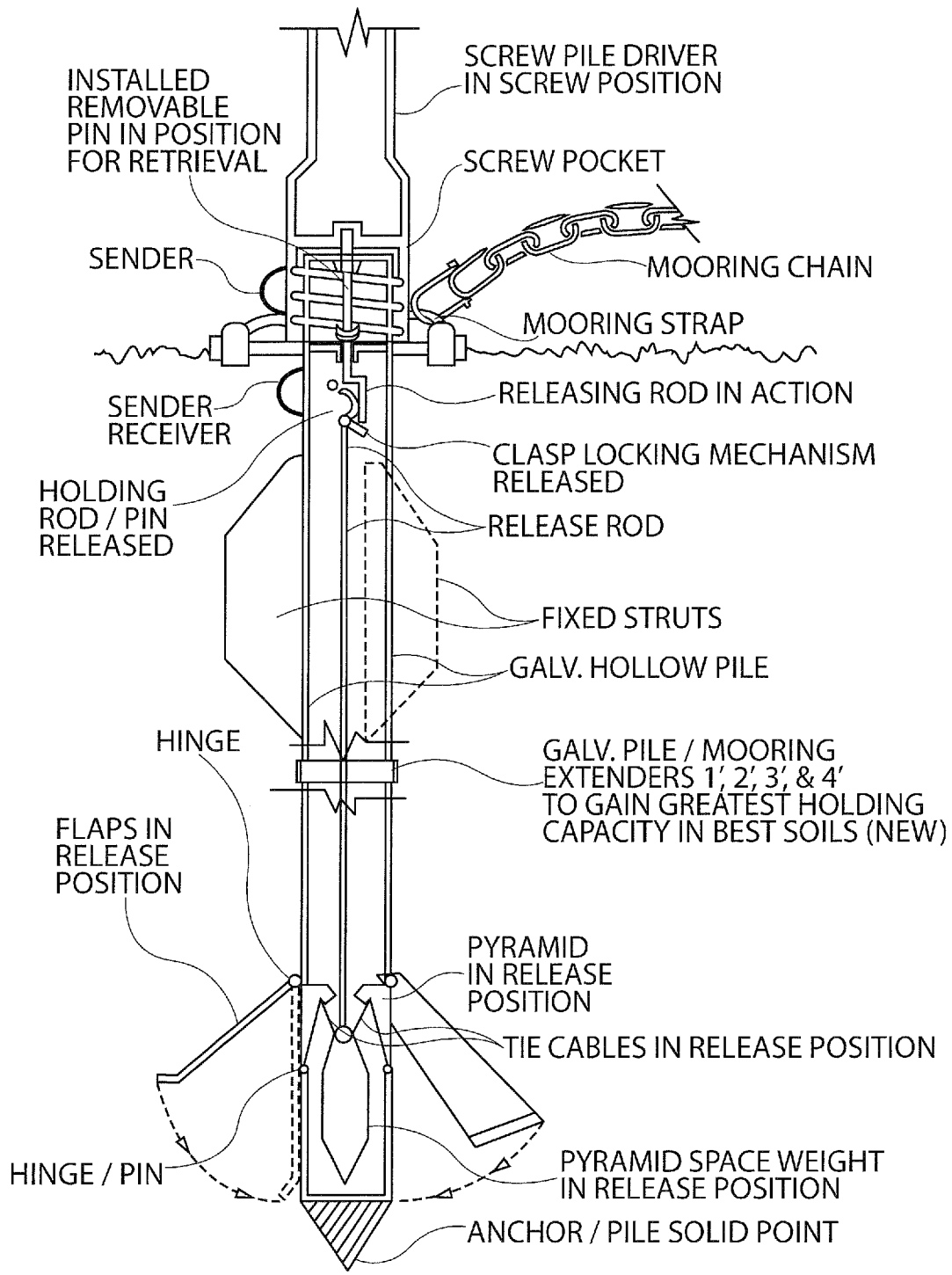

FIG. 15 shows another embodiment of the invention for docks and wharfs. Alternatively, as shown in FIG. 15A, the ground mounting poles as previously described may be driven into a lake, river or sea bed, the pile pulled up into a final position, and the pile driver uncoupled, e.g. by unscrewing, and a mooring attached to the proximal end of the pole. However, the mooring shown in FIG. 15A in practice would require periodic inspection of the mooring and chain, which in some waters is generally every one to three years. Once the toggles were deployed getting the device out of the bottom of the harbor would do circumferential damage to the bottom, and therefore the eco-system around the pile.

FIGS. 15B-15G illustrate an alternative removable mooring pile in which the mooring pile is driven into place and the stabilizing plates are deployed and locked, the stabilizing plates can then be unlocked, once unlocked, the mooring pile can be pulled upward and removed. Due to the upward pulling motion and soil resistance the deployed but unlocked stabilizing plates will fold against the mooring pile 200 allowing retrieval of the pile with minimal disruption of the surrounding soil. first pound the mooring pile 200 into the bottom of the harbor, but then using a releasing mechanism shown in FIGS. 15C, 15D, and 15E that lets the toggles 202 fold back down to the side of the pile and be retrieved in a more environmentally friendly manner. The pile mooring is installed with a pile drive mechanism with a spring 204 that latches on to the cap of the mooring. The release drive pin 206 is removable in this pile system, while driving the pile in, it would be removed. Removal of the pile requires the release drive pin to be installed and once installed, the release drive pin is used to push the release plate downward and release the movable locking mechanism to be removed in a retrieval position.

The pile uses a retaining wire 208 to hold the toggle flat against the pile mooring during initial driving. Once the pile was driven to the bottom to approximately 2' from the depth where the pile would be situated, the wire would be released, and then the pile driver would continue to drive the mooring the additional 2' deeper to release the flaps which would lock into position. Upon needing inspection, the same pile driving service that was used would have a pin in the middle of the pile for the release of the toggle locking mechanism, and there would be a sender and a sounder 210 inside of the pile cap itself and the pile driver. This will allow the barge operator or boat operator to determine the location of the mooring in the murky water. This is especially important in waters with muddy conditions at the bottom to latch onto the pile mooring. The pin release drive would then drive the central pin and plate down into the mooring and release the lower retainers to an outward position, thereby permitting one to lift the mooring out without any major destruction to the bottom of the seabed. The mooring chains 212 could be checked, the cap pile mooring would be taken off, all mechanisms checked, e.g. at required time intervals determined by the Harbor Master or Government Body, for standard maintenance, and lubricated and repairs needed to worn parts and would be reinstalled inside or outside the pile mooring, and the mooring would be reinstalled in approximately the same location as it had been taken up.

FIGS. 15F through 15I are based on the workings and description of FIG. 15A. However, unlike 15A, the devices in these figures have a release and retrieval feature that is similar to FIG. 15A but use a round, hollow, galvanized (or other corrosion resistant treated), pile that is extendable in the field. The extendable hollow piles have a mid-section wherein additional lengths or extenders of the hollow pile can be added using threaded, sleeved or other types of couplers shown in FIGS. 15H and 15I in order to gain the required holding capacity in differing soils. This is particularly advantageous if the area where the new mooring pile has different bottom soil conditions than previous or adjacent mooring piles, the pile length can be adjusted in length until it provides the correct pull out resistance.

Figure 16:
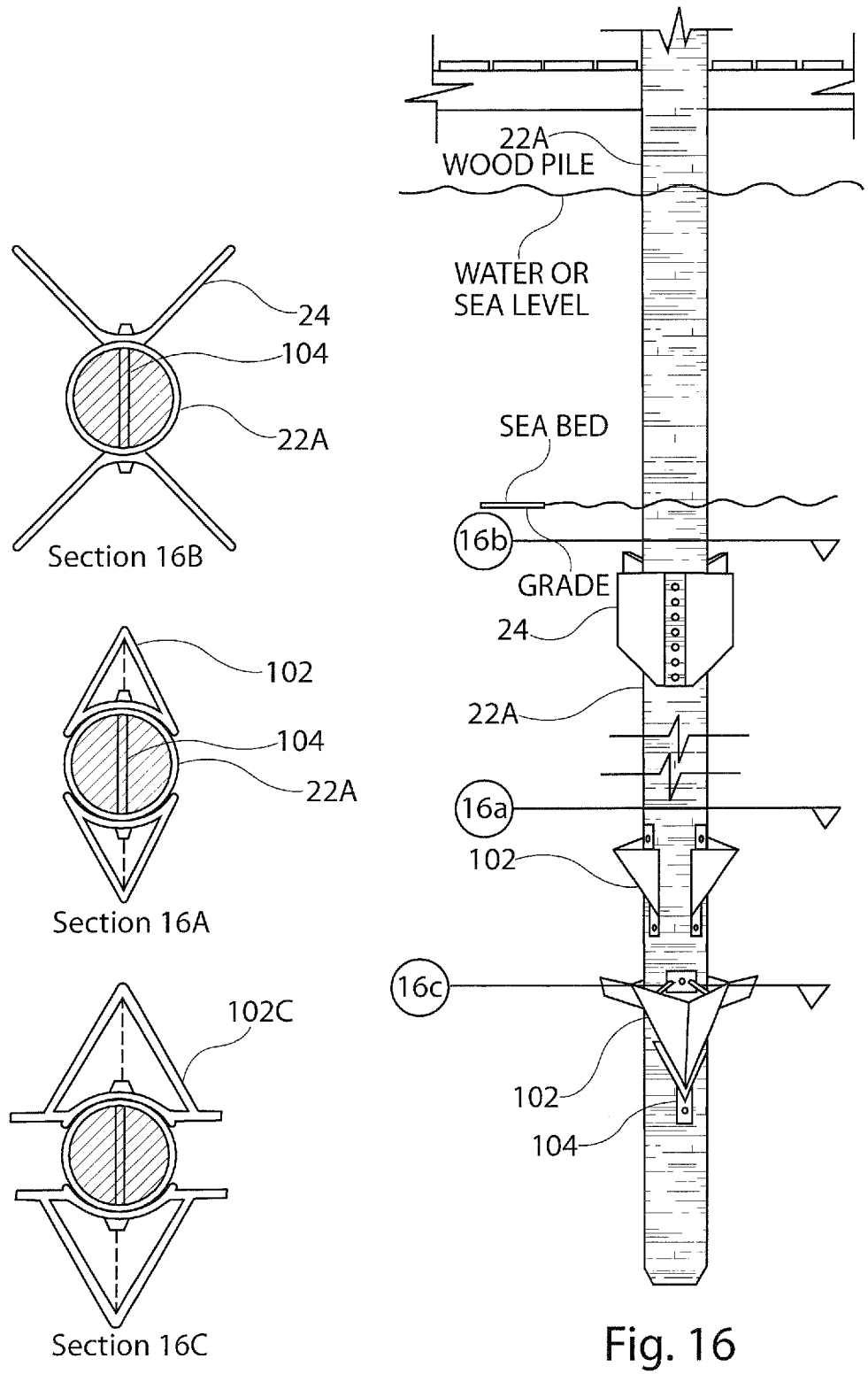
FIG. 16 is a prospective detail of a wood pile with wharf, pier, or building in accordance with another embodiment of the present disclosure.
Figure 17A:
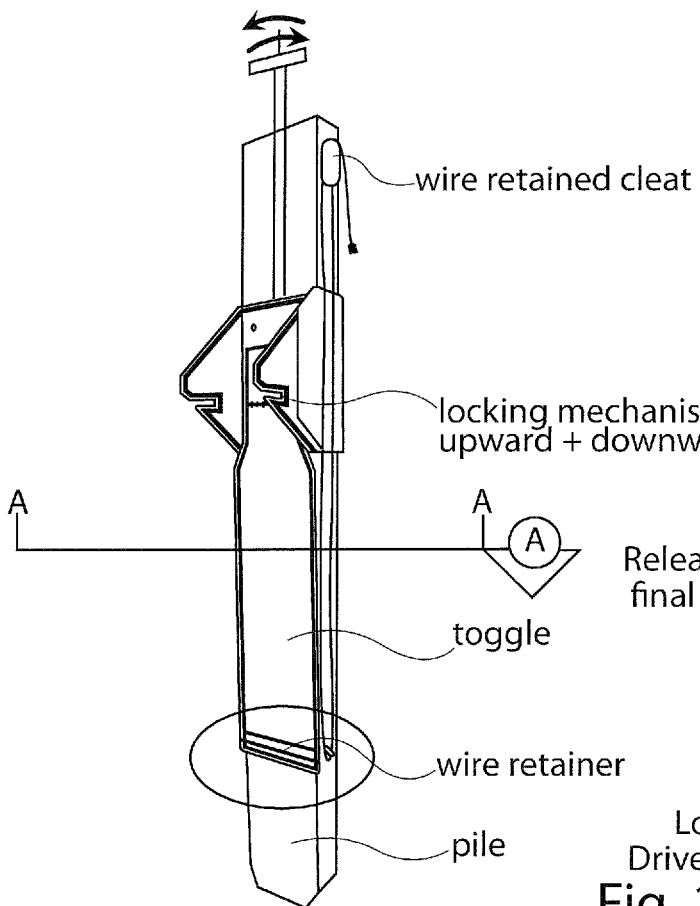
FIGS. 17-24 illustrate still yet other embodiments of the plate locking mechanism of the present disclosure.
Figure 17C:
Figure 18A:
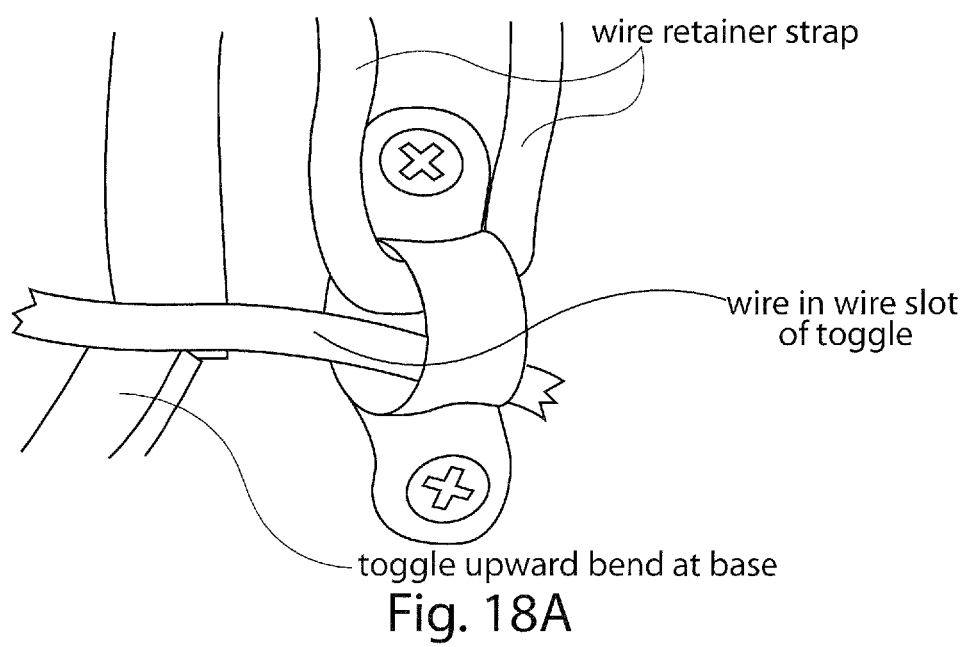

FIG. 16 illustrates another preferred embodiment of the disclosure in the form of a wharf, pier, or building. As illustrated in FIG. 16, geometrically shaped scoops or solid pyramids are attached via bolts or external clamps and work on a standard wood piles, metal piles or piles made of other materials such as fiberglass or concrete, in possible lengths of 20 to 60 feet long. In FIGS. 16A and 16C a steel, fiberglass, composite, galvanized steel or stainless steel scoop or solid pyramid is thru bolted, utilizing steel (standard steel will work in most cases as there isn't any oxygen present in the sand, mud, or clay under the ocean, so use all types), stainless steel, or other corrosion resistant bolts 104, to the wood pile to provide upward twisting and downward resistance to the pile from tidal, wave, or ice conditions. FIG. 16 B shows the lateral plates 24 being thru bolted, utilizing steel, fiberglass, composite, stainless steel, or other corrosion resistant bolts 104, through the wooden pile number 22A to resist lateral load to the structure above. FIG. 16C shows the scoop pile with winglets 102C to resist both upward lateral loads and downward forces because of its thrusting outward form.

Referring to FIGS. 17-24, there is illustrated yet another embodiment of the invention in which the toggle plates may be locked in place with a locking mechanism so that the pile or posts would resist not only vertical uplift, but also downward pressure as well. The locking toggle plates as will be described in more detail below may be used alone, or in combination with the double pounder plates discussed previously, or with the scoop pyramid pile element. In such embodiment, the double pounder porcupine plates should be placed near the bottom or distal end of the piles or posts, while the locking toggle plates located intermediate the distal end of the piles or poles and the proximal ends or top ends of the piles or posts.

Figure 19:
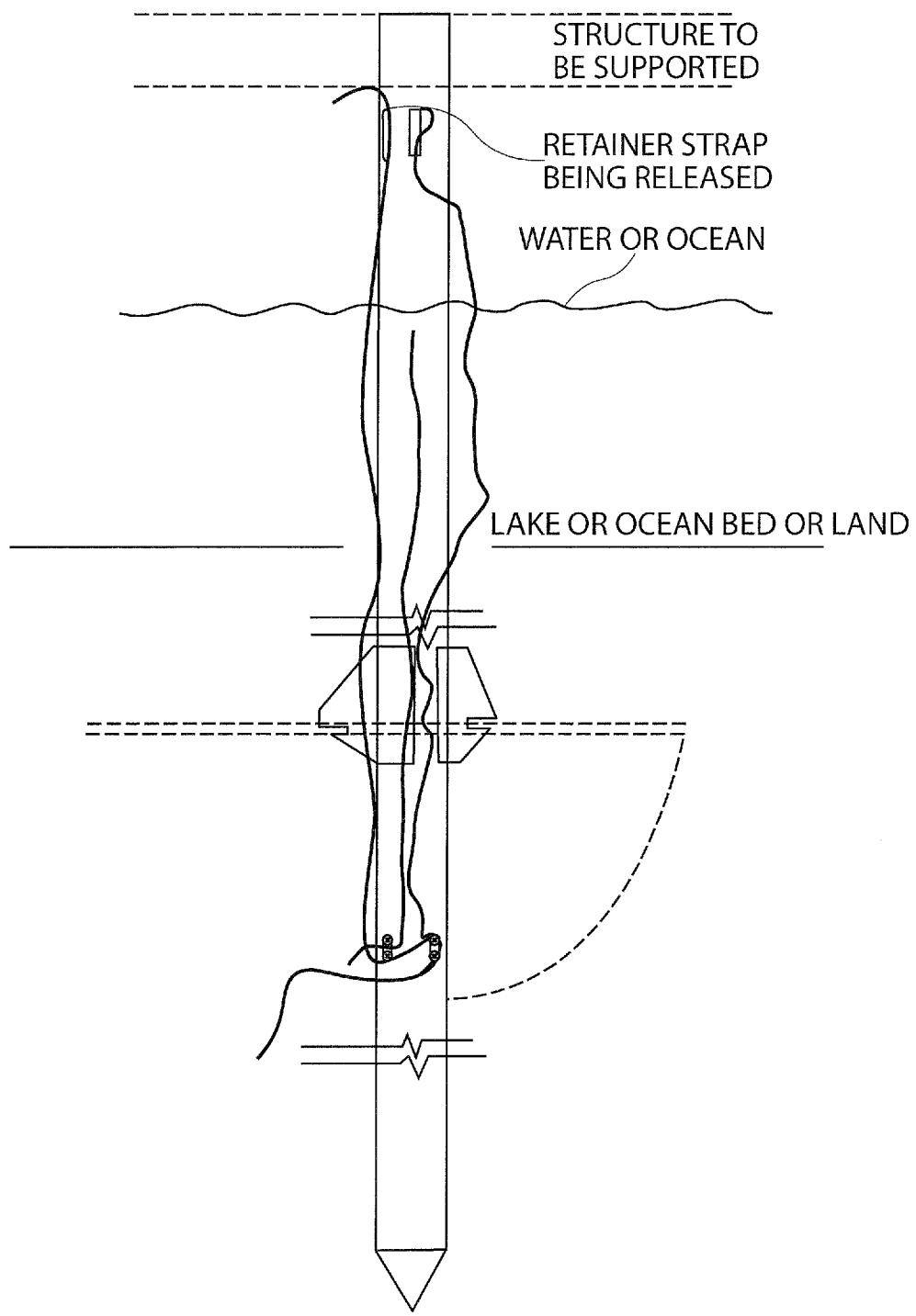
Figure 20:
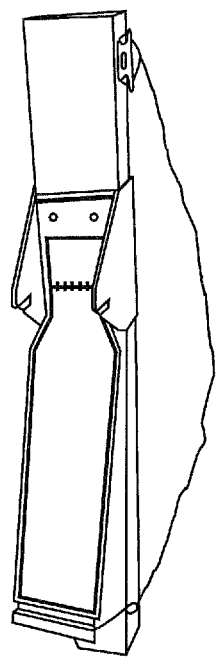
Figure 21:
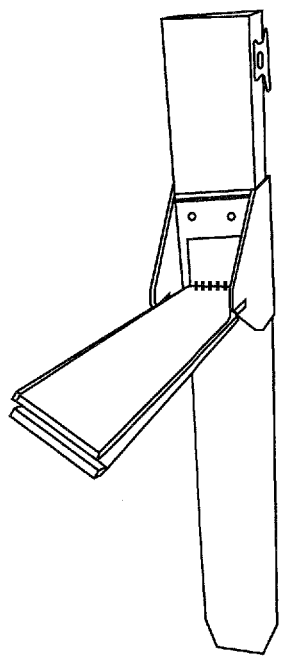
Figure 22:
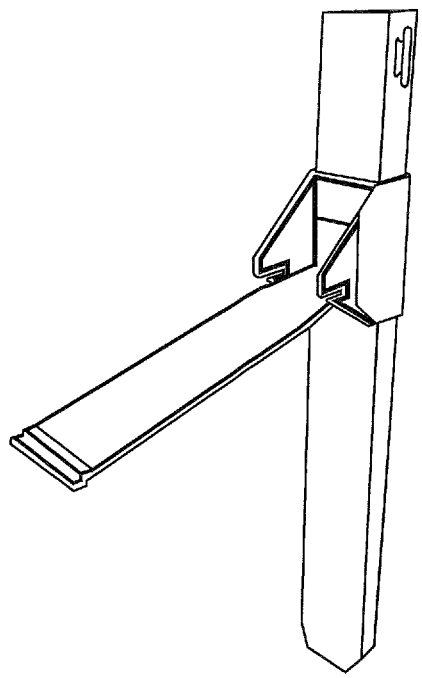
Figure 23:
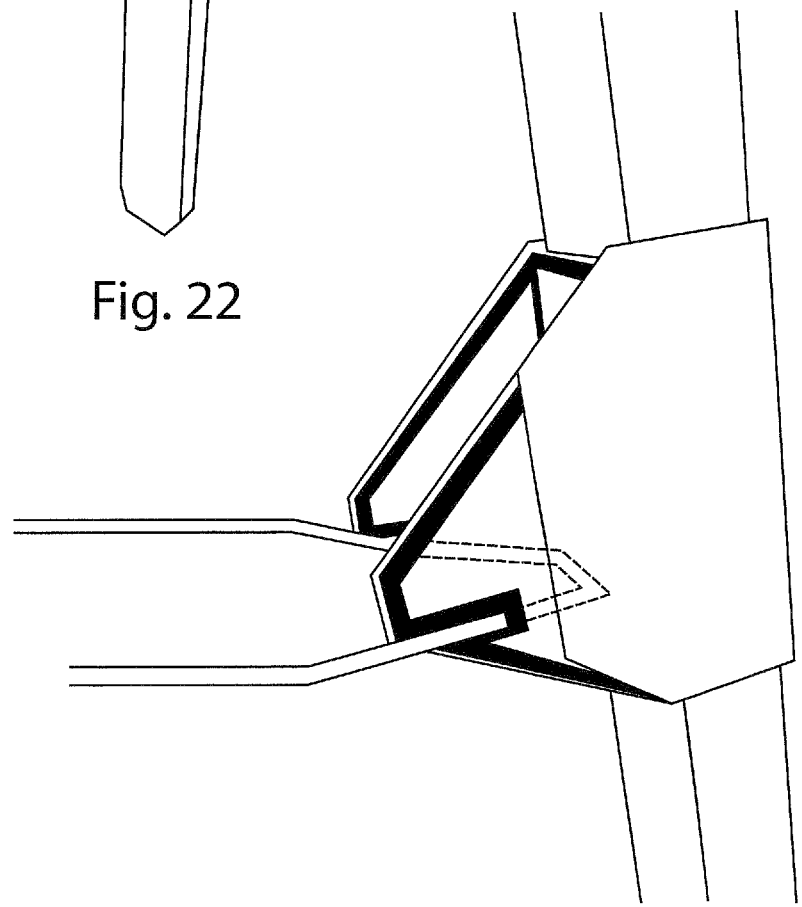

Referring to FIGS. 17-24, the toggle locking mechanism is bolted or fastened to the pile with a hinged plate attached. The toggle plate is tied to the post by stainless steel wire (FIGS. 17A and 18A, or it could be held in place utilizing the metal rod locking shaft shown in FIGS. 17B, 17C, 18B, and 18C.), where the toggle is in the driving position and there would be either 2 or 4 toggles (or more) on each pile. The pile would be driven to a recommended depth about a foot or two less than the final finished depth. The retainer wire would be removed or metal rod released, or a combination of metal rod to wire at top of locking mechanism (as seen in FIGS. 19, and 18B and 18C). The pile would then be driven into the locking mechanism by driving the pile downward (FIGS. 20 and 21) instead of lifting to set the toggle as discussed previously. Alternatively, as shown in FIGS. 17B-17D and 18B-18C, the wire holding system is a wire viable solution for small piles (6 inch to 12 inch diameter or square) and for moorings; however it generally will not work with larger piles such as 18" round or 24" square tube piles. There may be 40' long or even larger piles which may be 20 or 24" square, and 80' long. This will require a different mechanism. Instead of the wire that is shown in FIGS. 17A and 18A.

FIGS. 17B-17D and 18B-18C shows a rod latching releasing mechanism that would be inside the metal pile or routed into a wooden pile. The mechanism locking metal so that the metal retaining pin or latch at the bottom would be connected to a continuous rod to above grade, and can simply be twisted in an open position and the pile driven so that the flaps will be released into the toggle locking mechanism. This will provide both downward and upward added strength of the pile. Also included on FIGS. 17D and 18B are rock deflectors (shown in phantom), where required, depending on soil conditions.

FIGS. 21-24 show how the toggle may be locked in the toggle locking mechanism to take both upward and downward loads. This occurs when the angle shaped toggle pushes out the lower lesser steel locking mechanism and forces the toggle into the slot and against the larger upper locking mechanism strut, click and lock. This upper larger beefier structure is such to resist breakage from the pile driving hammer. This latter feature is preferable in that it would be driven and locked in both directions vertically and downward and truly make the pile a much stronger structural element. Also, the toggles or flaps can be mounted in any location along the length of the pile, as similarly shown in FIG. 11G of the double pounder.

Figure 24:
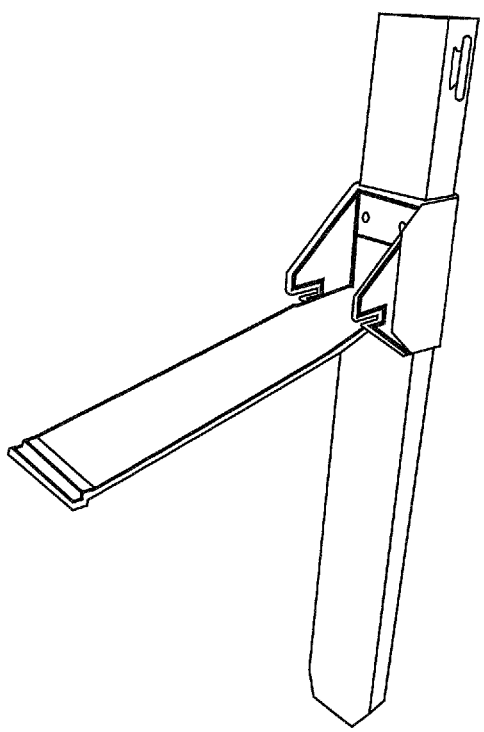

FIG. 24 shows the toggle just before it engages the slot at this point the toggle is bending the steel lower locking mechanism just before it snaps into the locking slot.

Figure 25:
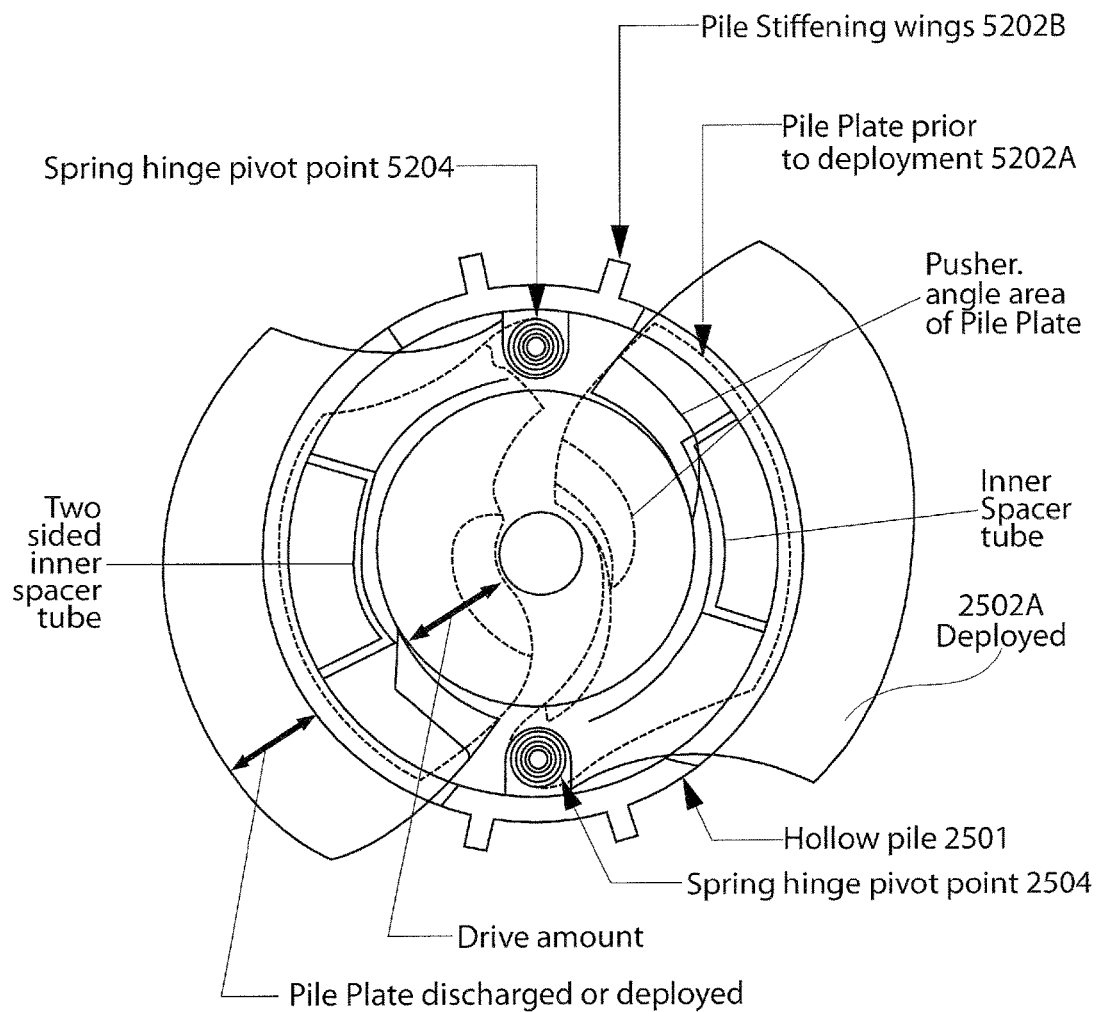
FIGS. 25, 25A, 25B, 26, 26A and 27 depict other alternative embodiments of posts of the present disclosure showing the use of a rotary ram, laterally deployed stabilizer plates and bars, rotary hub mechanism, deployed stabilizers and locking mechanisms.
Figure 25A:
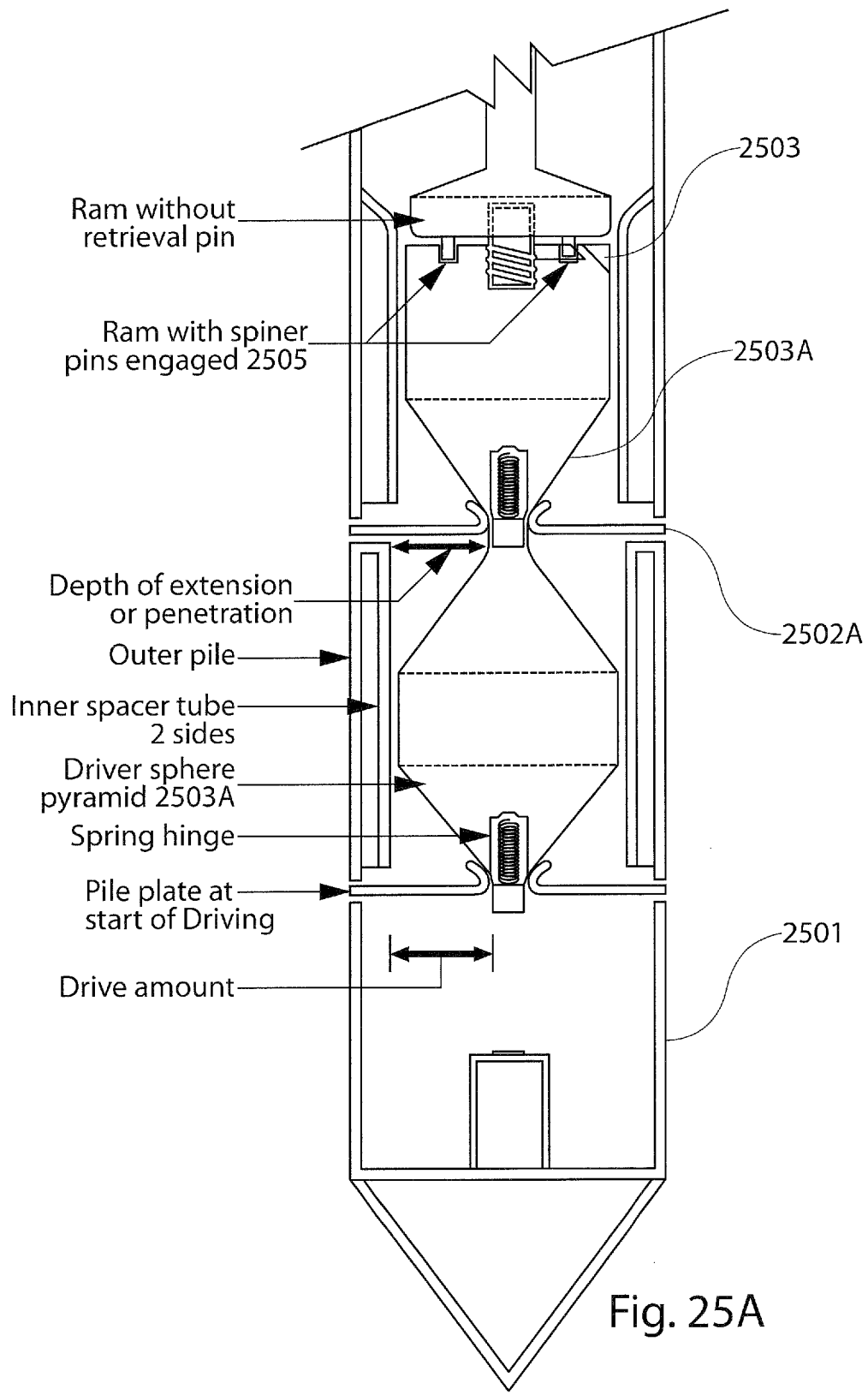
Figure 25B:
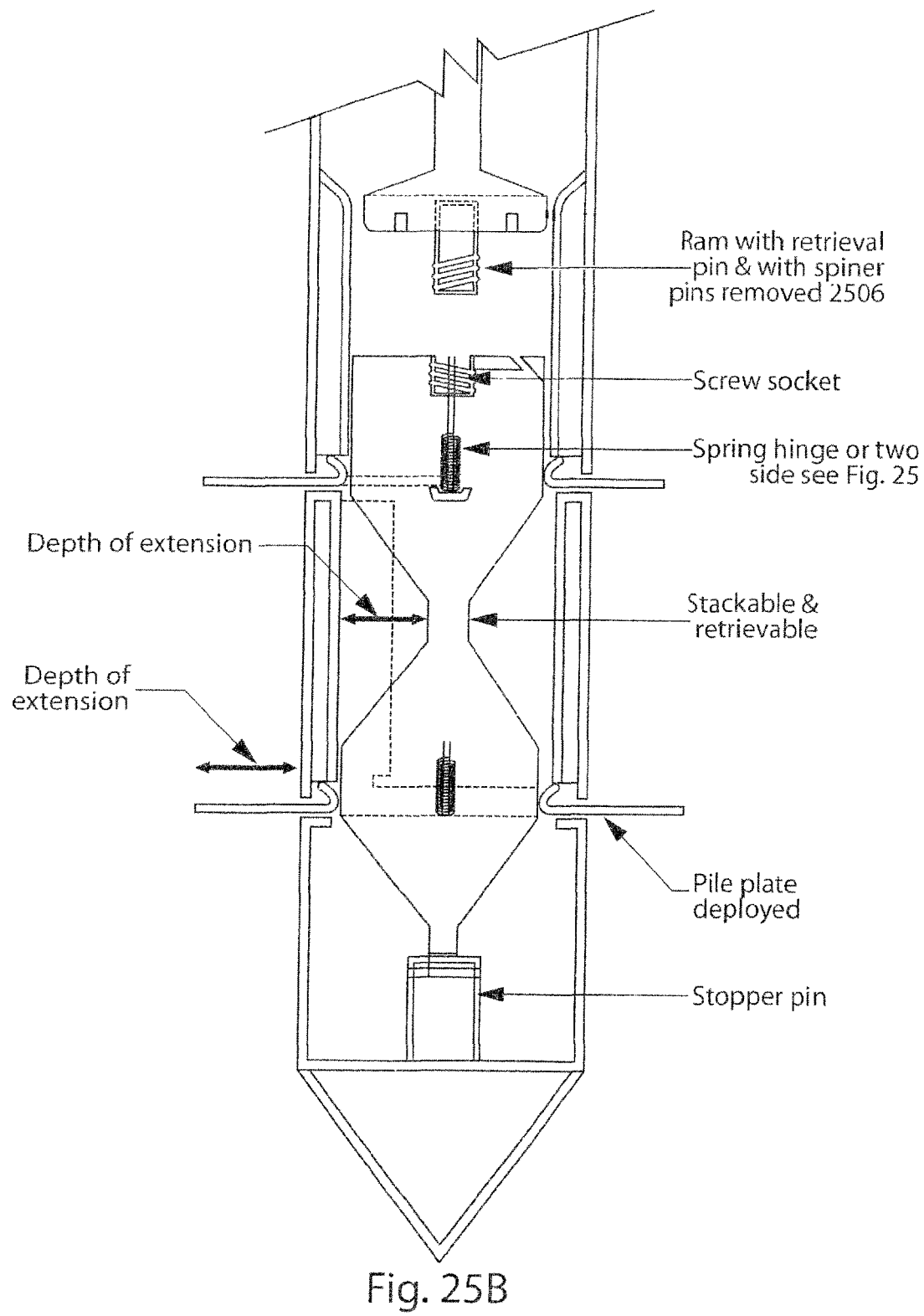

In FIGS. 25, 25A and 25B another preferred embodiment is shown wherein the pile or pole stabilizing elements can be deployed at a desired depth in the soil and then be retracted in order to facilitate removal of the pile retrieval pin 2506.

The hollow pile 2501 is shown wherein the retracted stabilizing plates 2502A (shown in broken lines in FIG. 25) are held within the hollow cavity of the pile or pole with a spring loaded hinge or pivot point 2504 in FIG. 25. The hinge or pivot point is held in place by pivot plates that are attached to the wall of the hollow pile or pole. The pivot plates are attached by welding or bolted into place prior to driving the pile or pole into the soil. The stabilizing bars or plates extend laterally outward through slots that are machined or saw cut through the pile or pole wall. The pile is reinforced from machined slots with pile stiffen wings 5202B. The laterally extended stabilizing plates shown as 2502A lock into position when a wedge shaped driver 2503A is pounded and spun into position shown in FIG. 25B. Once in position the wedge-shaped driver holds the stabilizing plates in place. In further embodiments the stabilizers made of flat metal, are arranged in a sequential stack, as the tapered driver is pounded down the tapered driver is rotating with the spinner pins 2505, pushing each stabilizer out (shown in solid lines in FIG. 25) and starting to deploy the next sequential stabilizer in the stabilizer stack (see FIG. 25A, and FIG. 25B).

Figure 26:
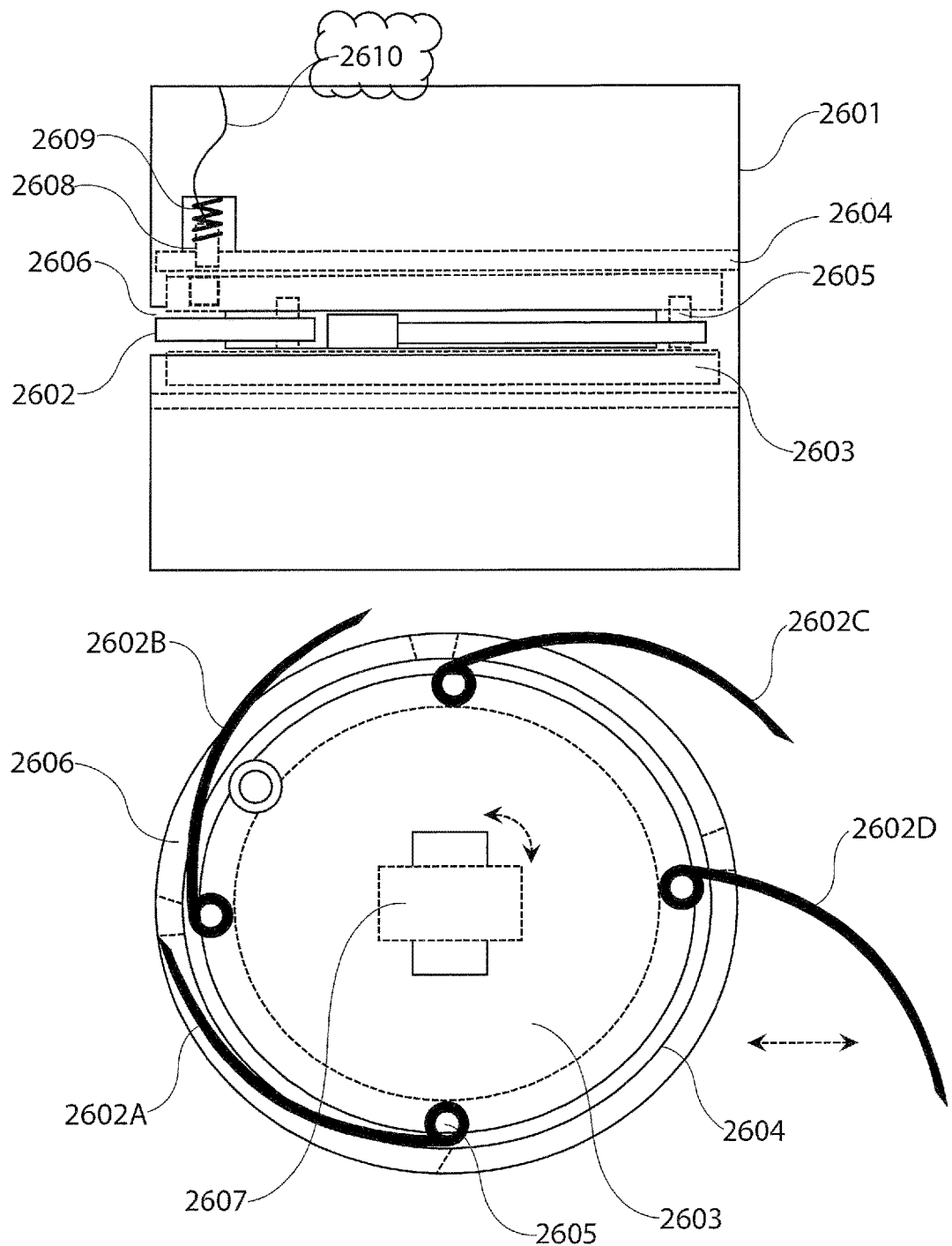

FIG. 26 Depicts lateral plates or bars 2602 mounted to an internal rotary hub 2603 by a hinge point 2605 and lay retracted in a recess 2606 that runs latitudinally around the hollow pipe or pile 2601. The advantage to this type of design is that once the pile or pole is driven to desired depth the stabilizers can be deployed without the need of further depth adjustment of the pile or pole in order to deploy stabilizers. The internal rotary hub with a keyway 2607 is held in place by one or more retaining rings 2604. The retaining rings, attached by using corrosion resistant screws, bolts or even welding are located on the interior cavity wall of the hollow pile or pole, hold the rotary hub in place not allowing vertical movement of the rotary hub as the pipe or pile is driven into place.

The external ends of the stabilizers are shaped such that when the hub is turned the stabilizers dig into the soil in an outwardly protruding manner shown in 2602A-2602D and lock into place using a spring 2609 tensioned pin 2608 with a cable 2610 attached to one end. Pulling the cable attached to one end of the spring tensioned pin unlocks the stabilizers and turning the internal hub the opposite direction retracts the stabilizers allowing removal or the pole or pile.

Figure 26A:
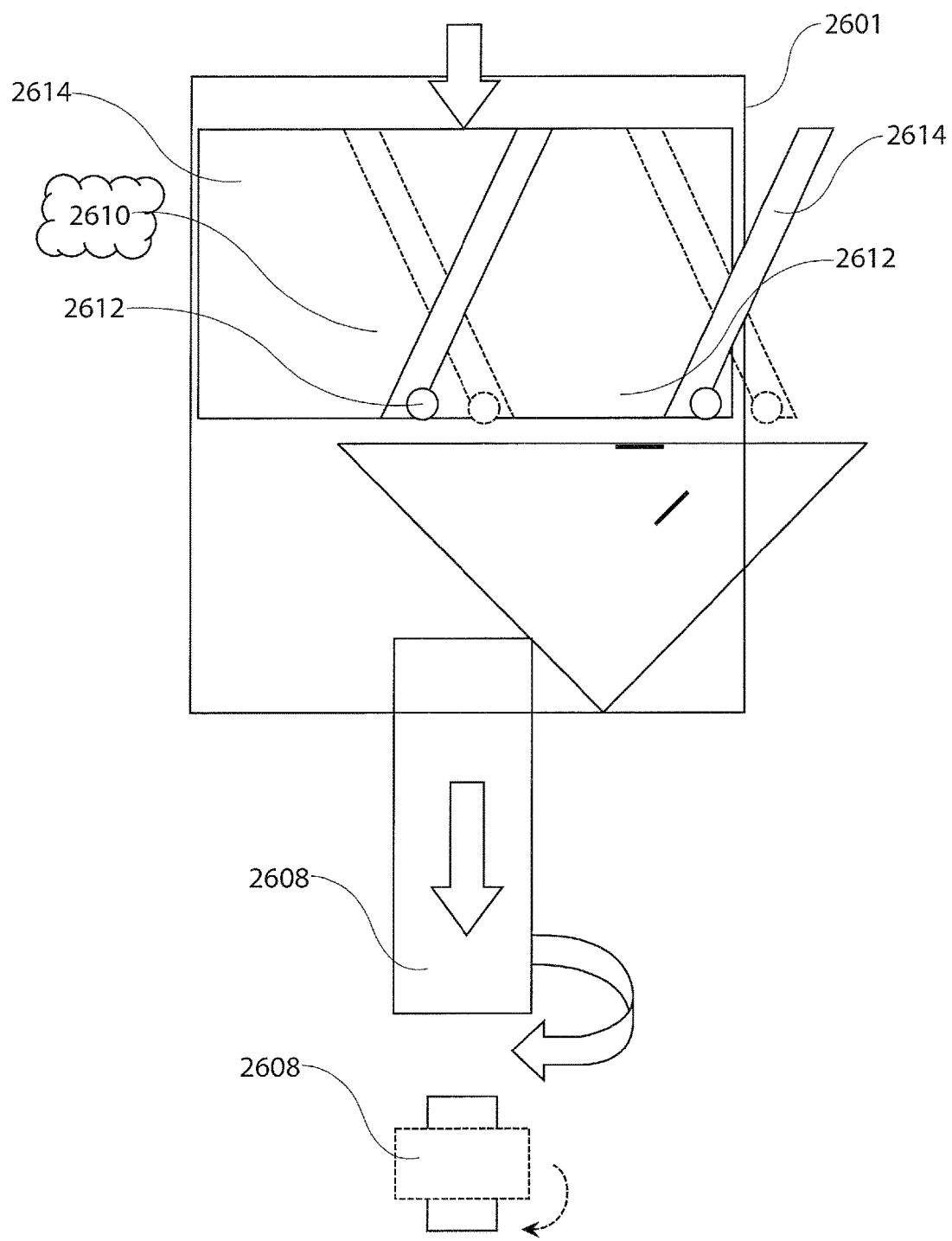
Figure 27:
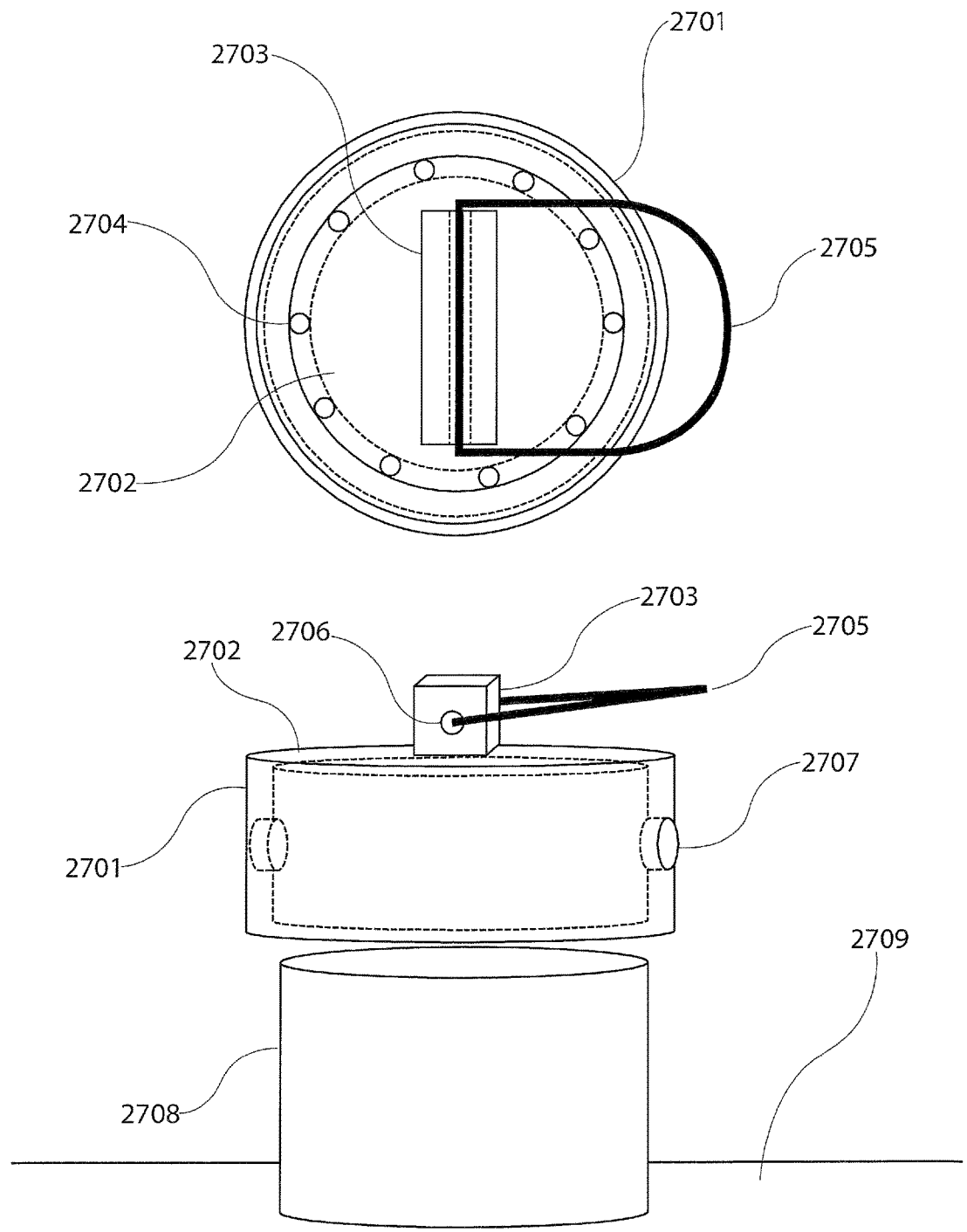

FIG. 26A shows an internal rotary driver mechanism that deploys the horizontal stabilizers without need to adjust pipe or pile depth in order to deploy stabilizers. The disclosed driver mechanism 2610 is held internally within the hollow pile or pipe 2601 and guided by threads or grooves 2614 in the sides of the driver at a pitch and count that allows the driver to rotate as it is pounded down. The driver is guided by round rods 2612 that are attached to the internal wall of the hollow pile or pole. The driver is additionally tapered allowing use of this driver for the stabilizers depicted in drawing 26A. As the driver is driven down through a central keyway hole, the key shaped post 2608 rotates, where the key shaped post in turn rotates the rotary hub and deploys stabilizers laterally outward from slots 2606 in the wall of the hollow pipe or pile. Stabilizers are held in a recess and hinged at a single point 2605. In FIG. 27 yet another preferred embodiment a rotary ground mounted pole or pile cap 2701 is attached on the proximal end of the installed and stabilized ground mounting pole assembly 2708 that is in close proximity to the ground or an exterior surface 2709 wherein the cap has an outer diameter and an inner diameter and a top surface, wherein the top surface contains a removable rotating hub 2702. In one preferred embodiment, the rotating hub is sealed from the elements utilizing a sealed bearing 2704, the bearing is part of the assembly and is removable for service and replacement if needed, and the cap is attached to the pole mounting assembly at one or more holes 2707 wherein the cap can be attached, bolted, welded etc. to the ground mounted assembly.

In another preferred embodiment, the rotating hub assembly uses ball bearings and O rings or gaskets to help seal out the elements and allow rotary movement. This assembly can be un-assembled and serviced as needed over the life of the ground mounted pipe. The rotating hub can rotate an unrestricted 360 degrees in the plane of the top surface and additionally incorporates a hardware attachment face 2703 to facilitate mounting or connecting the type hardware needed to properly attach the ground mounted pipe assembly to a structure, truss, cable or other component of an architectural element for the designed purpose intended.

In yet another embodiment an inverted U shaped mounting rod 2705 with hinged connections 2706 on each end of the U is attached to the hardware attachment face. The hinge connections allow pivoting of the inverted U in an arc of at least 180 degrees, thereby allowing unrestricted rotation and arcing movement of anything attached to the installed and stabilized ground mounting pole. The rotary ground mounted pole or pipe assembly cap is attached to the above ground portion of the building assembly to be secured or structure to be built.

Figure 28A:
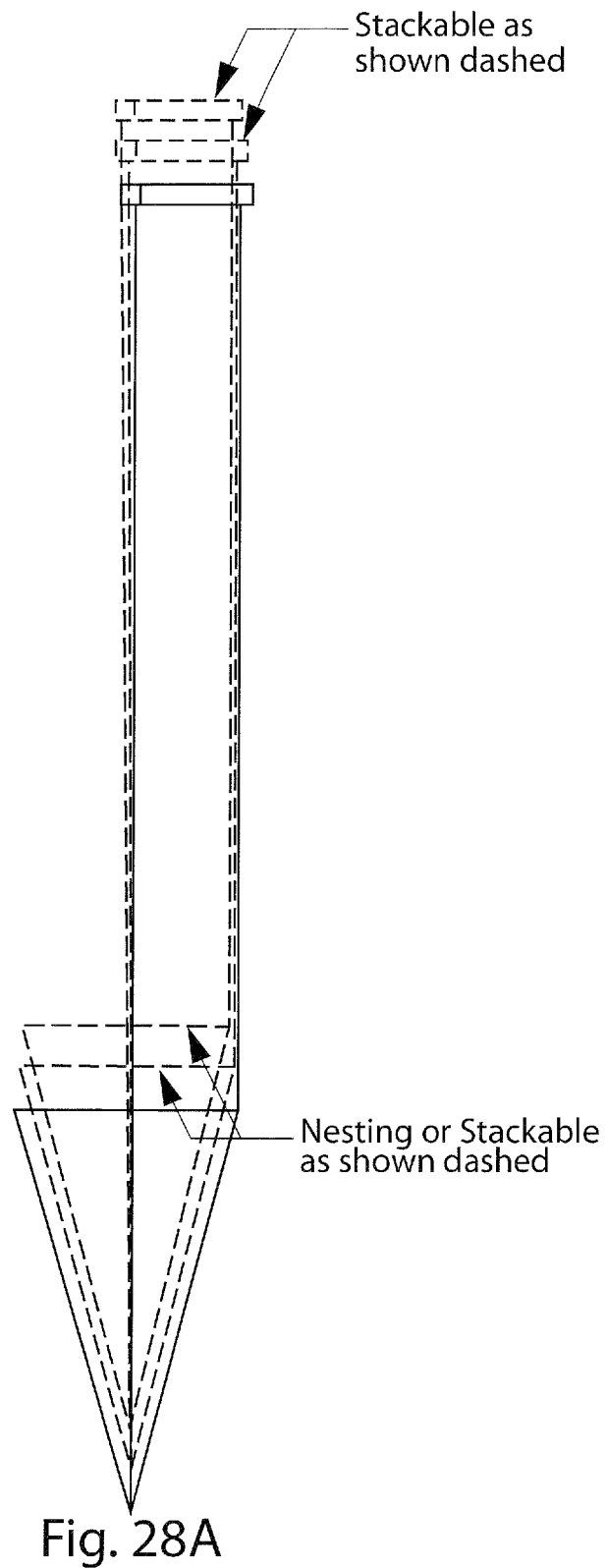
Figure 28B:
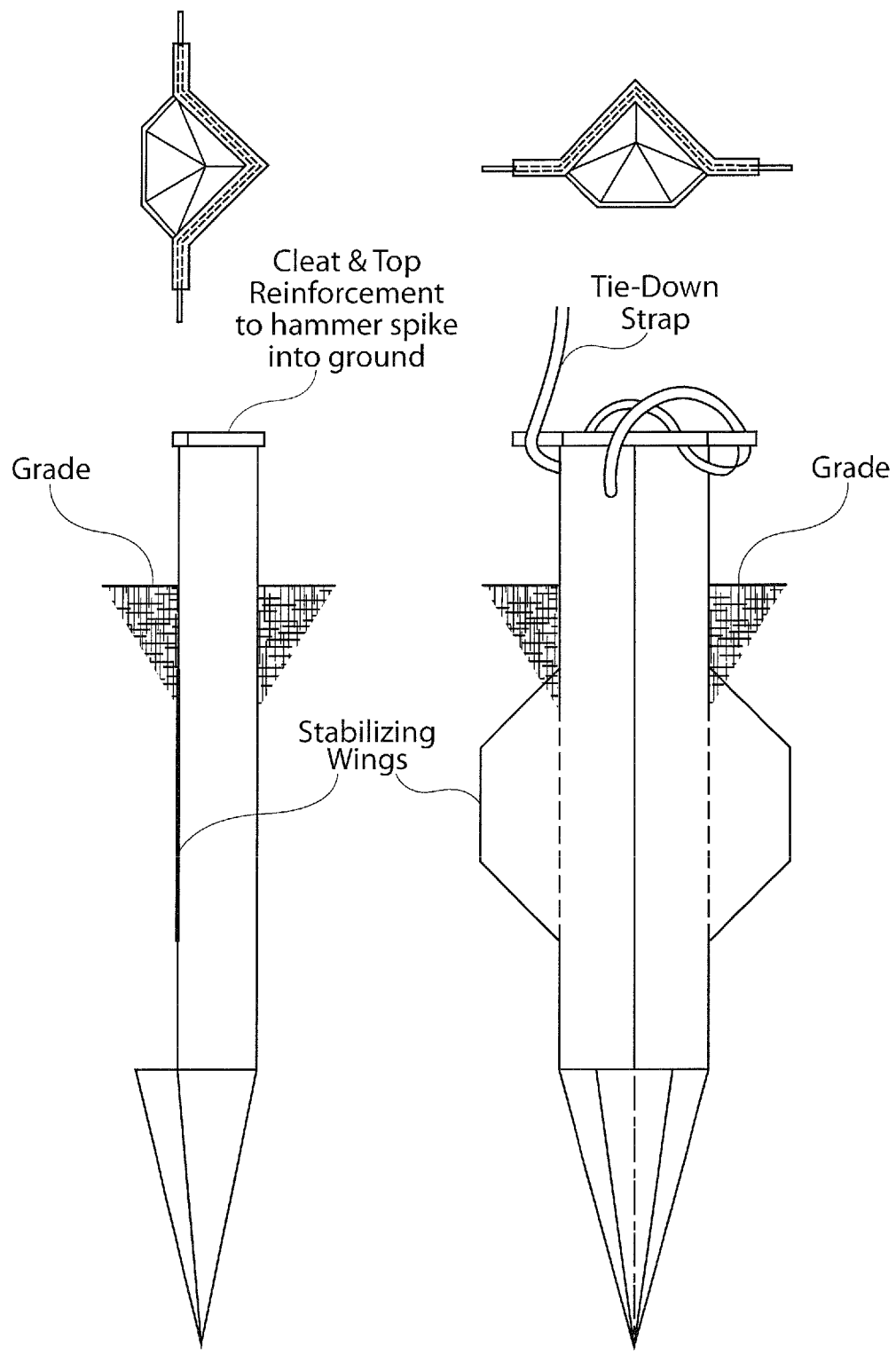
Figure 28C:
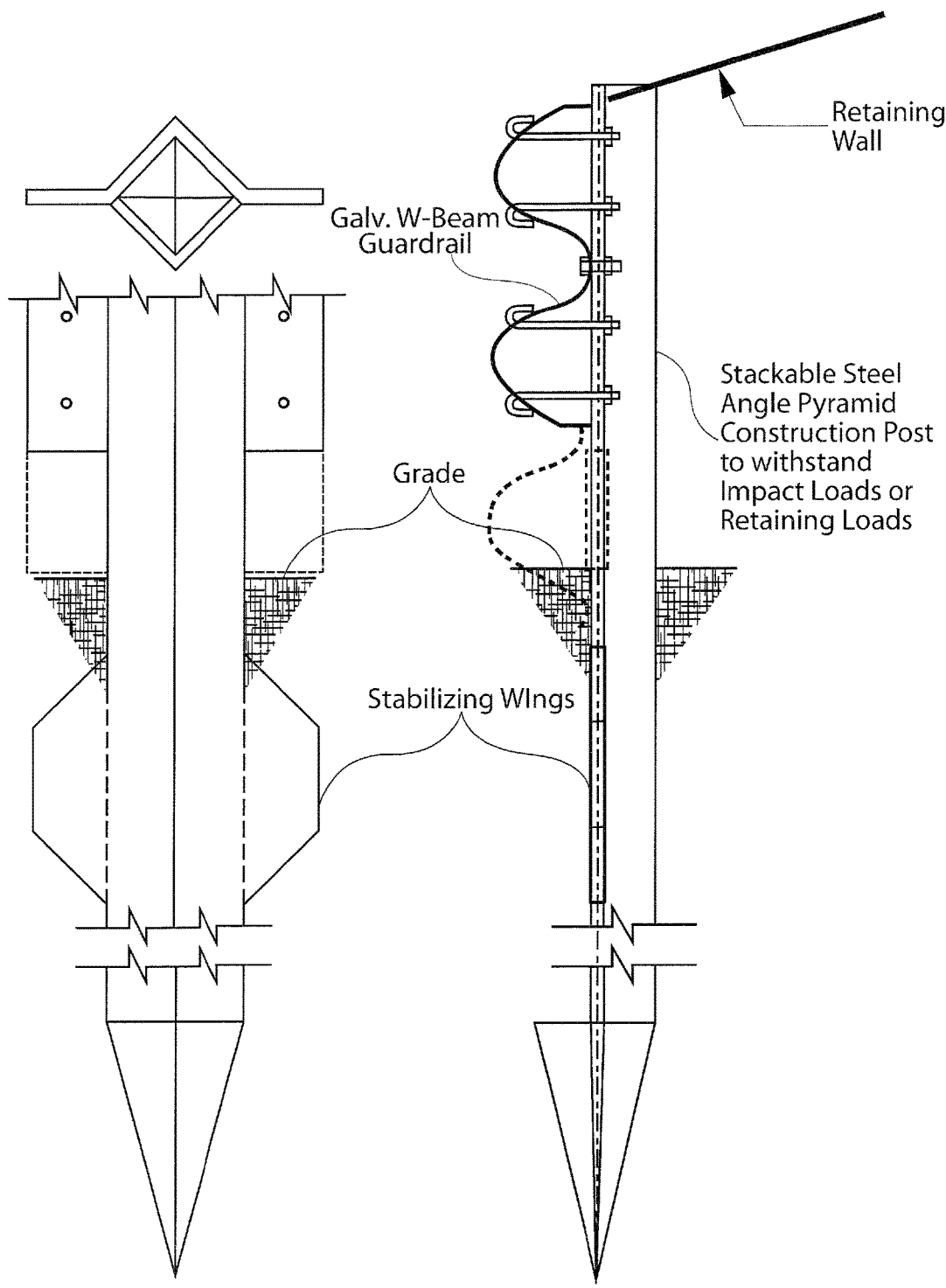

FIG. 28 depicts a smaller version of the disclosed invention wherein the ground mounting assembly shown 2802 has a pointed endcap 2806 with a closed geometric cross section that is closed at one end in the shape of a cone or square and forms a scoop pyramid or cone 2812. The geometric cross section of the mid section 2802 is in the shape of an "L" or partial circle or other geometric open shape in cross-section, with stabilizing winglets 2804 and an enlarged (in cross section) reinforced end 2808 that is intended to be hit by hammer to drive the ground mounting assembly into the ground. A cleat 2810 is provided to prevent a wire or rope connecting the ground mounting assembly to the object being held in place or stabilized, from sliding off the ground mounting assembly when in use such as for staking down camping equipment such as a tent or awning to a camper. Additionally it would be useful as landscape plant anchors for trees or other plants that need to be stabilized using wire or rope until they are able to root in and stabilize themselves. FIG. 28B depicts a truncated nesting pyramid scoop hold down with a more aggressive point and scoop used the same as FIG. 28 but for harder ground but still nest one within the other for storage and re-use by campers, the military, and landscapers re-use as 28A. FIG. 28B depicts a truncated nesting pyramid scoop mounting assembly with tie-down straps. FIG. 28C depicts a beefer, longer version of nesting pyramid pointed scoop mounting assembly useful, e.g., for highway guard rail installations or retaining walls, and the like, and designed for pile driving machine installation.

Figure 29:
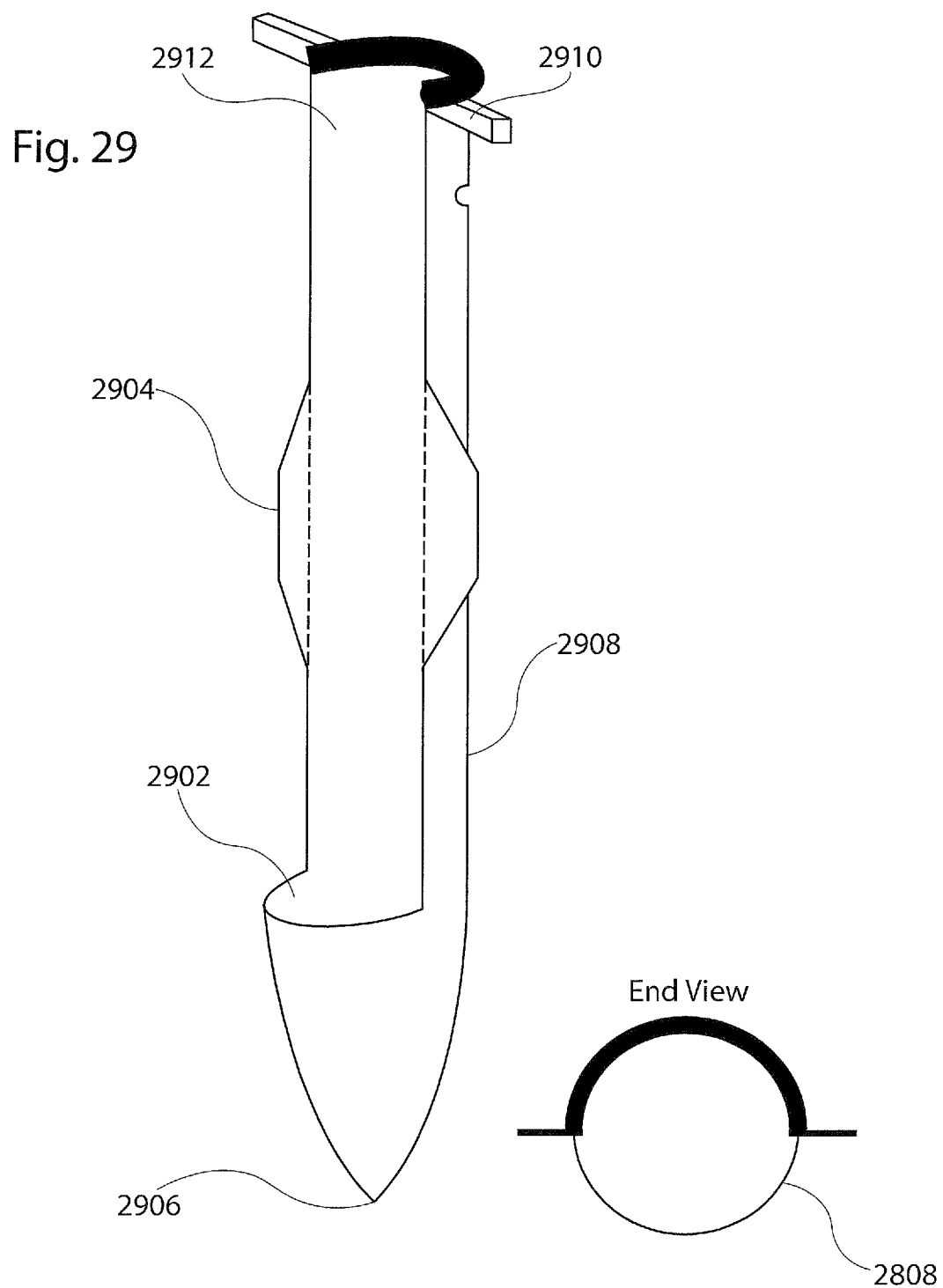

FIG. 29 depicts another geometric variation wherein the cross section or the mounting assembly is round or tubular. As in the case of the FIG. 28 embodiment, the mounting assembly can be driven manually with a hammer. The pointed endcap 2906 forms an open scoop 2902 that resists upward pulling of the ground mounting assembly 2908 once it is installed. The ground mounted assembly is hammered into the ground at the reinforced open end 2912 (see drawing) and includes stabilizing winglets 2904 as well as a notch or cleat 2910 (see drawing) to hold a wire or rope that is connected to the item being held or stabilized in place.

Figure 30:
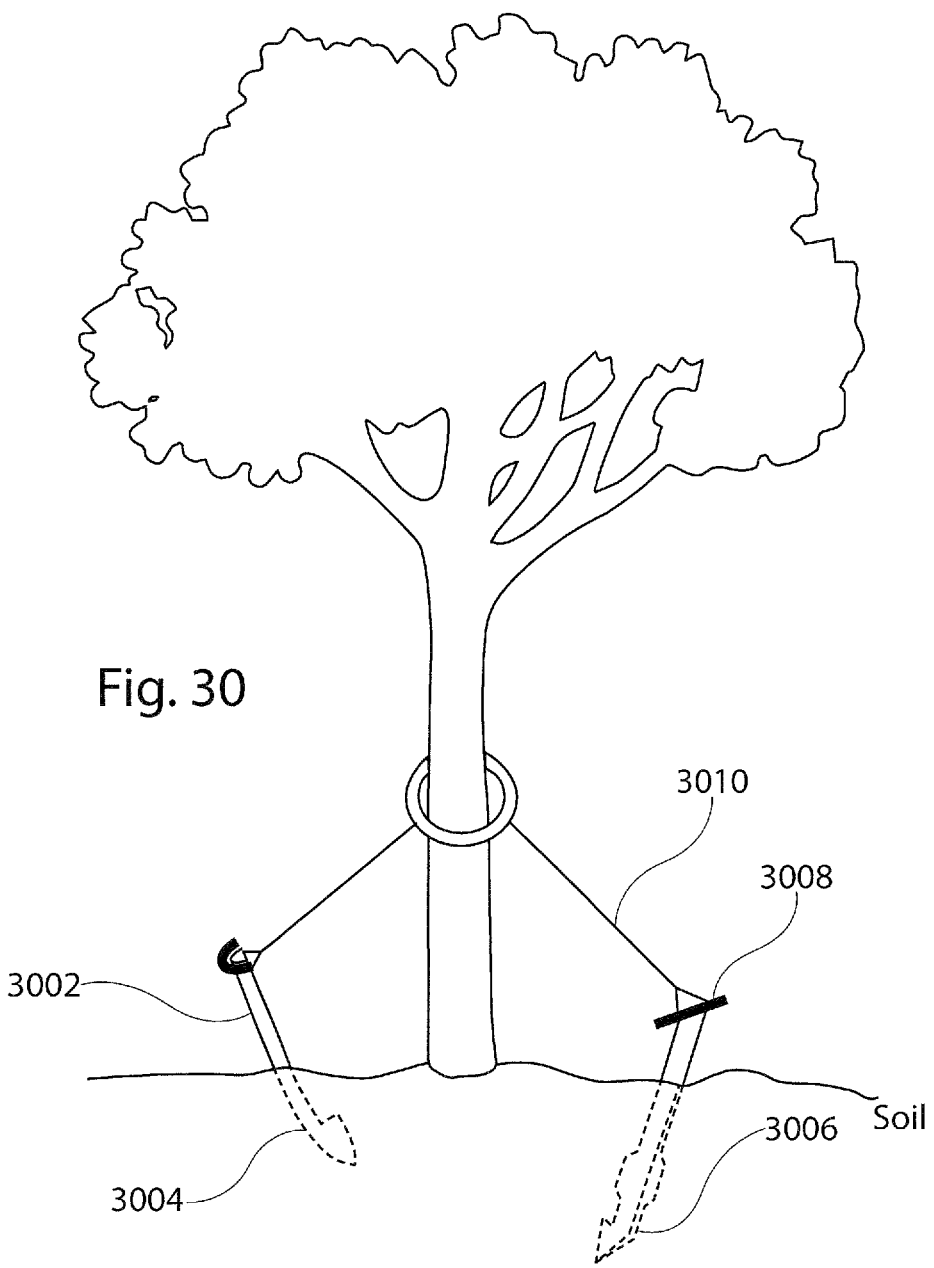
FIG. 30 illustrates use of a ground anchor of an accordance with the present invention.

FIG. 30 depicts the mounting assembly of the invention used to stabilize a tree. The ground mounted assembly 3002, once driven into soil as shown 3004 resists forces pulling against it by utilizing the scoop engaged with the soil offering superior holding tension shown as 3006 and the cleat 3008 stops the guide wire 3010 or rope from sliding off the ground mounting assembly that is anchoring the tree by connecting the tree to the ground mounting assembly with guide wires, cables or ropes.

In yet another embodiment, not shown, ground mounting poles as previously described may be driven into the ground adjacent a building or other structure and used to reinforce or stabilize the building or other structure. The ground mounting poles also may be used for stabilizing antennas, flagpoles, light poles, signs, etc.

All such modifications and variations are intended to be included herein within the scope of the present disclosure and protected by the following claims.

The invention claimed is:

1. A ground mounting structure, comprising:
a ground mounting pole having a proximal end adapted to extend from the ground, and a distal end adapted to be driven into the ground, wherein the ground mounting pole comprises an elongate hollow pole, said elongate hollow pole being open at the pole's proximal end and sized and shaped to accommodate a pole driving plunger or ram having one or more wedge faces, said hollow pole having a pointed cap at the pole's distal end, said hollow pole further having at least one stabilizing element slidably carried inside the hollow pole adjacent the hollow pole's distal end wherein said at least one stabilizing element adjacent the hollow pole distal end comprises at least one flat plate having a distal end positioned adjacent a slot in a wall of the hollow pole, adjacent the pole distal end thereof, said hollow pole further including slotted winglets configured to extend from an exterior wall of the hollow pole, and at least one plate roller adjacent the slot for supporting the at least one flat plate and for directing the at least one flat plate sideways from the hollow pole, guided through said slotted winglets by slots formed in the winglets on opposite sides of the at least one flat plate.

2. The ground mounting structure of claim 1, further including one or more plate stiffeners affixed to an exterior of the hollow pole adjacent the slot.

3. The ground mounting structure of claim 1, wherein the pointed cap is shaped as a pyramid.

4. The ground mounting structure of claim 1, wherein said pole is square in cross-section.

5. A method for mounting a structure to the ground comprising providing a ground mounting pole as claimed in claim 1;
driving the distal end of the ground mounting pole into the ground to a desired depth;
providing the plunger or ram, and
driving at least two flat plate stabilizing elements from the inside of the pole over rollers and guided through said slotted winglets on opposite sides of the flat plate stabilizing elements between the slotted winglets in position adjacent the distal end of the pole, by engaging the wedge faces of the plunger or ram in contact with proximal ends of the at least two flat plate stabilizing elements.

6. The method of claim 5, including the step of driving the pole to a desired depth using a pile driver.

7. The method of claim 5, including the step of driving the at least two stabilizing elements from the pole using a pile driver.

8. The ground mounting structure according to claim 1, wherein the at least one plate roller includes ball bearings.

9. The method of claim 5, wherein the rollers include ball bearings.

* * * * *